US009193543B2

(12) United States Patent
Digmann

(10) Patent No.: US 9,193,543 B2
(45) Date of Patent: Nov. 24, 2015

(54) LOADING DOCK WEATHER BARRIER APPARATUS

(71) Applicant: Charles Digmann, Dubuque, IA (US)

(72) Inventor: Charles Digmann, Dubuque, IA (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 13/933,843

(22) Filed: Jul. 2, 2013

(65) Prior Publication Data

US 2015/0007510 A1 Jan. 8, 2015

(51) Int. Cl.
B65G 69/00 (2006.01)

(52) U.S. Cl.
CPC ................... *B65G 69/008* (2013.01)

(58) Field of Classification Search
CPC .... B65G 69/008; B65G 69/001; E04G 21/30; E06B 7/18; B64G 1/305
USPC ................... 52/2.12, 173.2; 160/184; 14/71.5
See application file for complete search history.

(56) References Cited

U.S. PATENT DOCUMENTS

| | | | | | |
|---|---|---|---|---|---|
| 1,448,611 | A | | 3/1923 | Ainsa | |
| 2,892,463 | A | * | 6/1959 | Frommelt et al. | 14/71.1 |
| 3,322,132 | A | * | 5/1967 | Rieder et al. | 135/123 |
| 3,484,883 | A | * | 12/1969 | Van Marle | 14/71.5 |
| 3,538,655 | A | * | 11/1970 | Frommelt et al. | 52/173.2 |
| 3,638,667 | A | * | 2/1972 | Frommelt et al. | 52/173.2 |
| 3,639,934 | A | * | 2/1972 | Eggert, Jr. | 14/71.5 |
| 3,641,604 | A | * | 2/1972 | Eggert, Jr. | 14/71.5 |
| 4,120,067 | A | * | 10/1978 | Hone et al. | 14/71.5 |
| 4,333,195 | A | * | 6/1982 | Lichti | 14/71.5 |
| 4,554,768 | A | * | 11/1985 | Srajer | 52/173.2 |
| 4,601,142 | A | * | 7/1986 | Frommelt | 52/173.2 |
| 4,671,029 | A | * | 6/1987 | Bennett et al. | 52/173.2 |
| 4,817,223 | A | * | 4/1989 | Koch | 14/71.1 |

(Continued)

FOREIGN PATENT DOCUMENTS

| | | | | | |
|---|---|---|---|---|---|
| CA | 2321981 | A1 | * | 2/1998 | B65G 69/00 |
| CA | 2491199 | A1 | * | 6/2005 | B65G 69/00 |

(Continued)

OTHER PUBLICATIONS

International Searching Authority, "Written Opinion of the International Searching Authority," issued in connection with International Application No. PCT/US2014/044090, mailed on Nov. 24, 2014, 8 pages.

(Continued)

*Primary Examiner* — Brent W Herring
(74) *Attorney, Agent, or Firm* — Hanley, Flight & Zimmerman, LLC

(57) ABSTRACT

Example weather barrier apparatuses disclosed herein include vehicle-actuated mechanisms for forcibly pressing a seal member down against a roof of a vehicle parked at a loading dock. In some examples, rather than relying on gravity alone, rearward movement of the vehicle mechanically expands a seal member to create sufficient reach and sealing pressure to press the expandable seal member firmly against vehicle roofs of various heights and positions. In some examples, an example vehicle-actuated mechanism disclosed herein forces a compressible seal down against the vehicle's roof and maintains a compressive sealing force over a range of roof heights and positions. Some example weather barrier apparatuses disclosed herein include example means for mitigating certain jam conditions.

41 Claims, 18 Drawing Sheets

(56) References Cited

U.S. PATENT DOCUMENTS

| | | | |
|---|---|---|---|
| 4,873,801 A * | 10/1989 | Winters | 52/173.2 |
| 5,195,285 A * | 3/1993 | Alten | 52/173.2 |
| 5,953,868 A * | 9/1999 | Giuliani et al. | 52/173.2 |
| 6,205,721 B1 | 3/2001 | Ashelin et al. | |
| 6,233,885 B1 | 5/2001 | Hoffmann et al. | |
| 6,425,214 B1 | 7/2002 | Boffeli et al. | |
| 6,550,191 B2 * | 4/2003 | Hoffmann et al. | 52/173.2 |
| 7,185,463 B2 | 3/2007 | Borgerding | |
| 7,882,663 B2 * | 2/2011 | Borgerding | 52/173.2 |
| 8,042,307 B2 * | 10/2011 | Digmann et al. | 52/173.2 |
| 8,104,129 B2 * | 1/2012 | Tang et al. | 14/71.5 |
| 8,307,588 B2 | 11/2012 | Hoffmann et al. | |
| 8,327,587 B2 * | 12/2012 | Digmann et al. | 52/2.12 |
| 2003/0140579 A1 * | 7/2003 | Hoffmann et al. | 52/173.2 |
| 2010/0269427 A1 | 10/2010 | Digmann et al. | |

FOREIGN PATENT DOCUMENTS

| | | | | |
|---|---|---|---|---|
| DE | 4243297 C1 * | 2/1994 | | E06B 7/16 |
| EP | 0176751 * | 4/1986 | | B65G 69/00 |
| EP | 0493713 | 7/1992 | | |
| WO | WO 9943583 A1 * | 9/1999 | | B65G 69/00 |
| WO | WO 2009146237 A1 * | 12/2009 | | B65G 69/00 |
| WO | WO 2011162945 A1 * | 12/2011 | | B65G 69/008 |

OTHER PUBLICATIONS

International Searching Authority, "International Search Report," issued in connection with International Application No. PCT/US2014/044090, mailed on Nov. 24, 2014, 6 pages.

* cited by examiner

LOADING DOCK WEATHER BARRIER APPARATUS

FIELD OF THE DISCLOSURE

The present disclosure relates generally to loading docks and more specifically to loading dock weather barrier apparatus.

BACKGROUND

Dock weather barriers (weather barrier apparatus), such as dock seals and dock shelters, address the need to prevent the ingress of outdoor environmental conditions or contaminants (e.g., rain, snow, wind, hot/cold temperatures, insects, animals, etc.) into the interior of a building and cargo area of a vehicle during the loading or unloading of the vehicle. Dock shelters and seals also address the need to prevent the egress of conditioned air from within a building and/or a vehicle cargo area to the outdoor environment. Examples of dock seals and/or shelters with various header structures are disclosed in U.S. Pat. Nos. 6,205,721; 6,233,885 and 7,185,463.

Some known dock seals use side members having a compressible foam core or body surrounded by a coated fabric or vinyl outer layer. The foam core provides sufficient structural rigidity to enable the side members to be extended a short distance from the building wall surrounding the loading dock. The coated fabric outer layer protects the foam core from outdoor environmental conditions (e.g., moisture), provides wear resistance to repeated impacts from the rear portions of vehicles, and may provide desirable aesthetic qualities. Additionally, a header structure may span between and/or above the side members and is installed along a top portion of the loading dock opening. The header structure may be another compressible member similar in construction to the side members and, in some cases, may include a weighted fabric curtain that hangs downwardly to contact the top of a truck trailer to form an environmental barrier along the top of the trailer.

Another type of dock seal uses inflatable side members and a header structure having internal compressible resilient pads, which provide some degree of side member compressibility when the side members are in a deflated condition. In either case, when the rear portion of a vehicle (e.g., a truck trailer) is backed into either foam or inflatable dock seal side and header members, the side and header members are compressed toward the building wall to form a seal along the lateral and top back edges of the vehicle. If present, the head curtain sweeps along the top of the trailer to form a seal at the top of the trailer between the side members. Dock seals typically consume a relatively small amount of wall space and can provide a relatively high quality seal between the rear edges of a vehicle and the outside building wall surrounding the dock. However, when the dock seal side members are compressed, they may be displaced into or otherwise encroach on the opening to the rear of the docked vehicle. As a result, the compressed side member may interfere with operation of a fork lift and/or an operator during loading and unloading activities. In addition, inflatable dock seals are susceptible to power losses and tears that compromise the ability of the side members to inflate to provide an acceptable seal.

In contrast to dock seals, some known dock shelters use side members that are mounted to the outside building wall surrounding the loading dock. The side members are spaced well to the outside of the sides of a docked vehicle. The side members are configured to extend (i.e., to be cantilevered) an appreciable distance from the outside building wall, particularly in cases where a dock leveler protrudes from the dock opening. The side members may also support flexible seal members or side curtains extending inwardly from the side members across at least a portion of the opening defined by the side members. When a vehicle such as, for example, a truck trailer, is backed into the opening of the dock shelter, the inwardly facing edges of the seal members or side curtains resiliently deflect and sweep against the lateral sides of the trailer to form an environmental barrier therebetween. As with dock seals, dock shelters also typically include a header structure, which may include a head curtain, to form an environmental barrier along the top edge of the rear of the vehicle.

In contrast to dock seals, dock shelters typically provide unobstructed access to a vehicle cargo area opening (i.e., there are no foam pads or the like to be compressed and displaced into the opening). However, most known dock shelter side members are constructed using rigid wood, fiberglass or metal frames capable of supporting the significant weight of the seal members or side curtains, which are usually held at an appreciable distance (e.g., several feet) from the building wall. Such side members may be permanently deformed if they are impacted by a vehicle. Accordingly, bumpers or stops may be mounted to the lower edge of the dock shelter to prevent a vehicle (e.g., a truck trailer) from impacting and damaging the rigid shelter.

The rigid side members used to implement these known dock shelters are also typically mechanically coupled via the header and/or another rigid member to provide increased lateral rigidity to the dock shelter to minimize the ability of the side members to move from side-to-side. Because of this, the side members typically have to be mounted relatively far apart to accommodate a wide range of possible off-center vehicle positions. This relatively large distance between the rigid side members consumes a significant and, thus, expensive amount of building wall space for each loading dock opening.

More recently, dock shelters having impactable side members have been developed. The impactable side members are similar to those used with dock seals and typically use a foam core or body surrounded by a coated fabric outer layer. Seal members or side curtains, which may be constructed using a fabric and flexible fiberglass stays combination or a foam core and fabric combination, are typically mounted to the side members to extend at least partially across the shelter opening. When a vehicle is backed into the shelter, the inwardly facing edges of the seal members or side curtains deflect and sweep against the sides of the vehicle to form an environmental barrier or seal against the sides of the vehicle. In the event the off-center position of a vehicle results in the rear of the vehicle impacting a side member, the foam core or body of the side member is resiliently compressed. When the vehicle is pulled away from an impacted side member, the foam core of the side member causes the side member to substantially recover to its original condition or shape.

DETAILED DESCRIPTION

Figure 1:
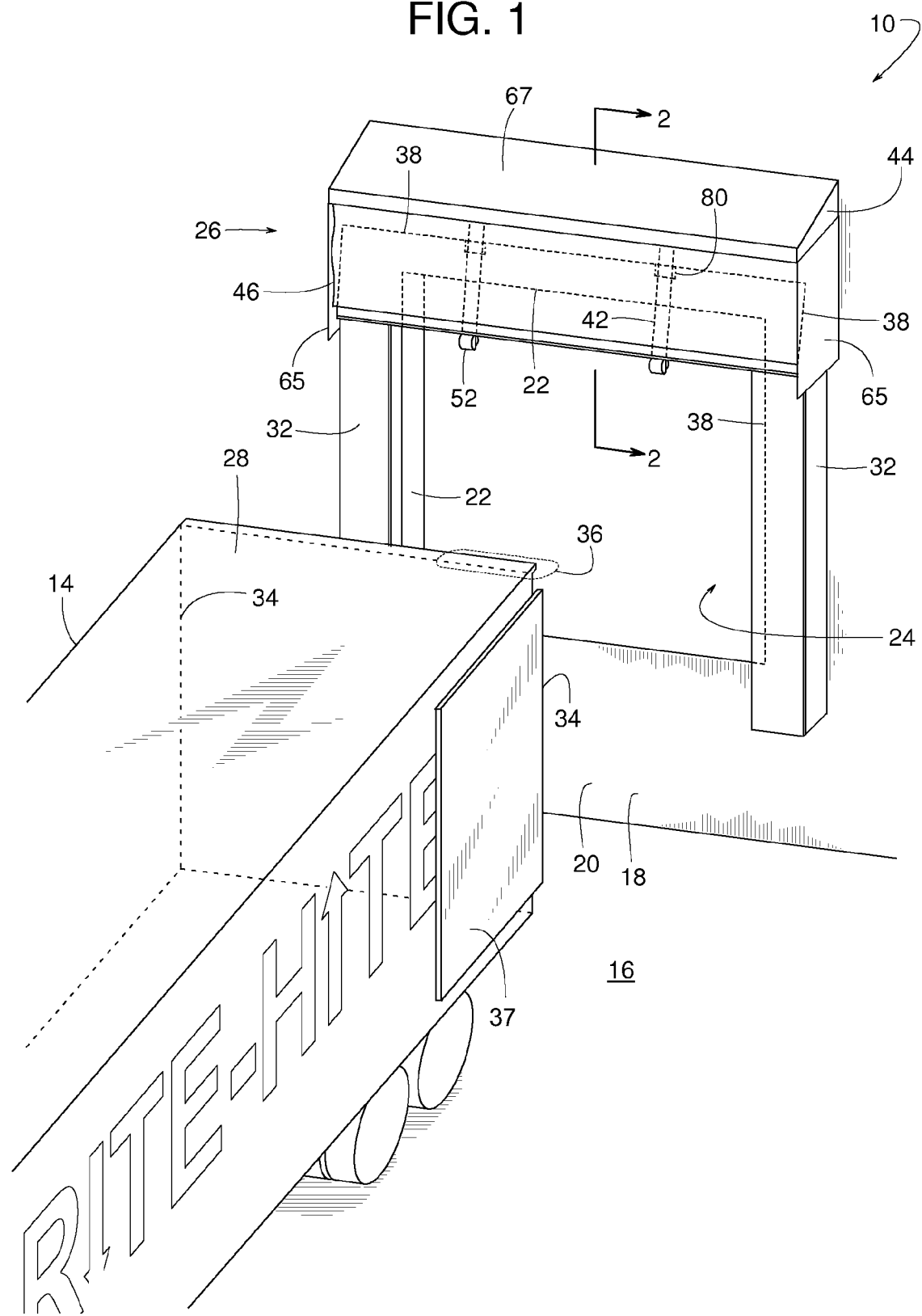
FIG. 1 is a perspective view of an example weather barrier apparatus constructed in accordance with the teachings disclosed herein. The example weather barrier apparatus of FIG. 1 is shown in a relaxed configuration with a vehicle at a departed position.

Example weather barrier apparatuses disclosed herein include vehicle-actuated mechanisms for forcibly pressing a seal member down against a roof of a vehicle parked at a loading dock. In some examples, rather than relying on gravity alone, rearward movement of the vehicle mechanically expands a seal member to create sufficient reach and sealing pressure to press the expandable seal member firmly against vehicle roofs of various heights and positions. In some examples, an example vehicle-actuated mechanism disclosed herein forces a compressible seal down against the vehicle's roof and maintains a compressive sealing force over a range of roof heights and positions. Some example weather barrier apparatuses disclosed herein include example means for mitigating certain jam conditions.

FIGS. 1-15 show example weather barrier apparatuses 10 and 12 for sealing or sheltering a vehicle 14 (e.g., truck, trailer, etc.) parked at a loading dock 16 of a building 18. Building 18 includes a wall 20 and a doorway 22 through which cargo is transferred between vehicle 14 and an interior dock area 24 of building 18. Example weather barrier apparatuses 10 and 12 are configurable selectively to a relaxed configuration separated from vehicle 14 (e.g., FIGS. 1, 2 and 13) and an activated configuration engaging vehicle 14 (e.g., FIGS. 4-6, 12 and 16-19).

Figure 2:
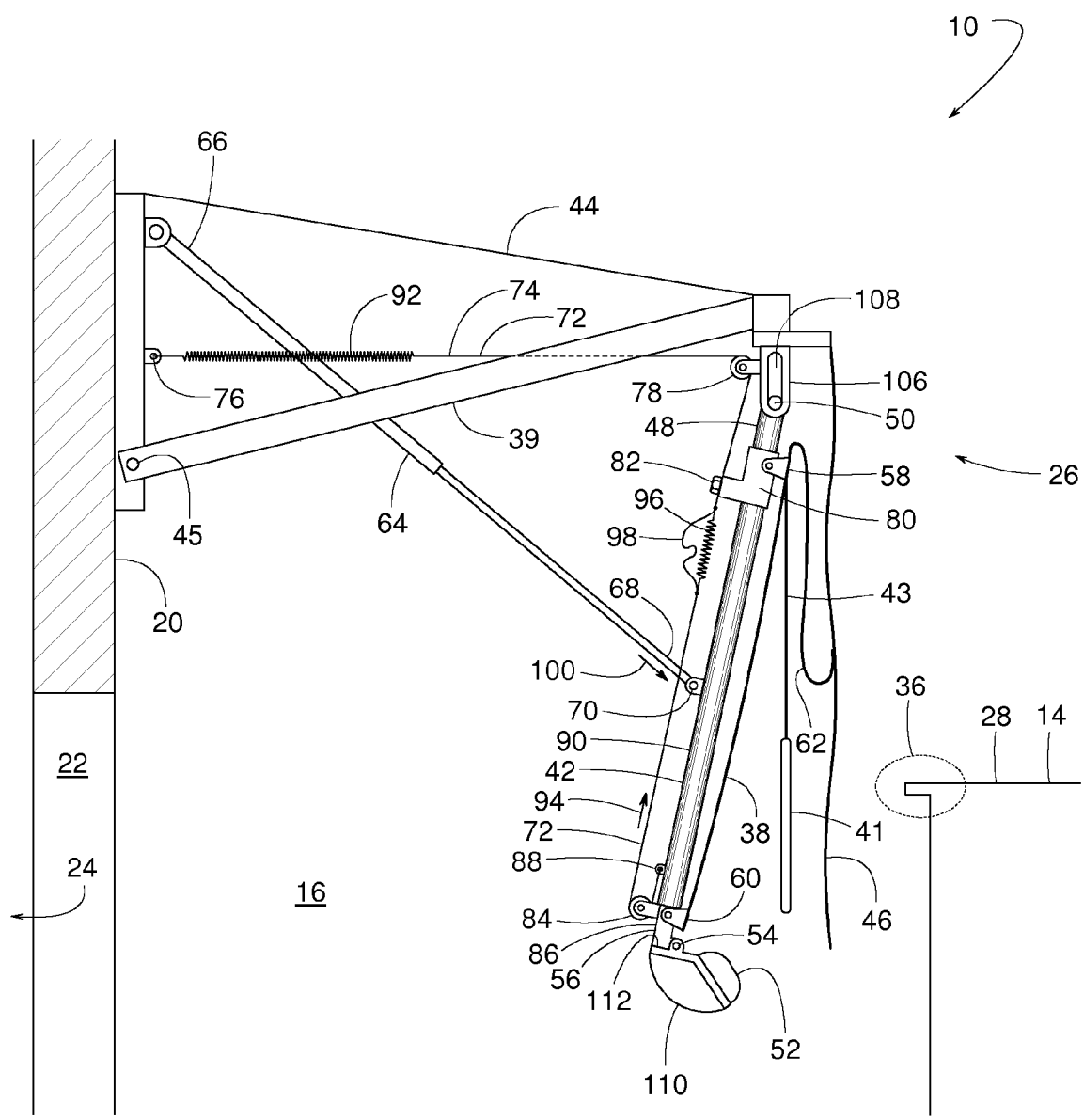
FIG. 2 is a cross-sectional view taken along line 2-2 of FIG. 1.
Figure 5:
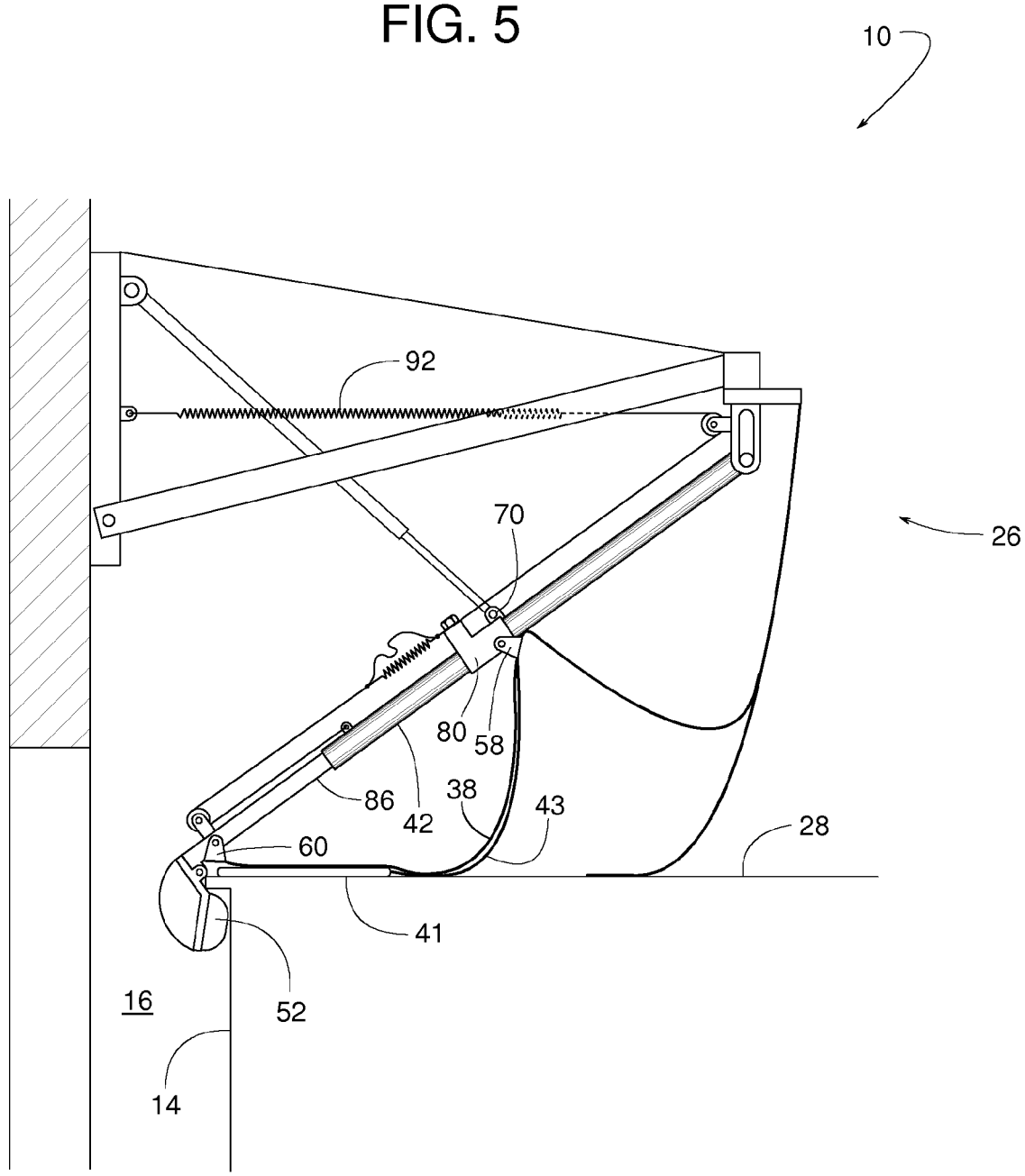
FIG. 5 is a cross-sectional view similar to FIG. 4 but showing the vehicle even farther into the example weather barrier apparatus of FIGS. 1-4.
Figure 6:
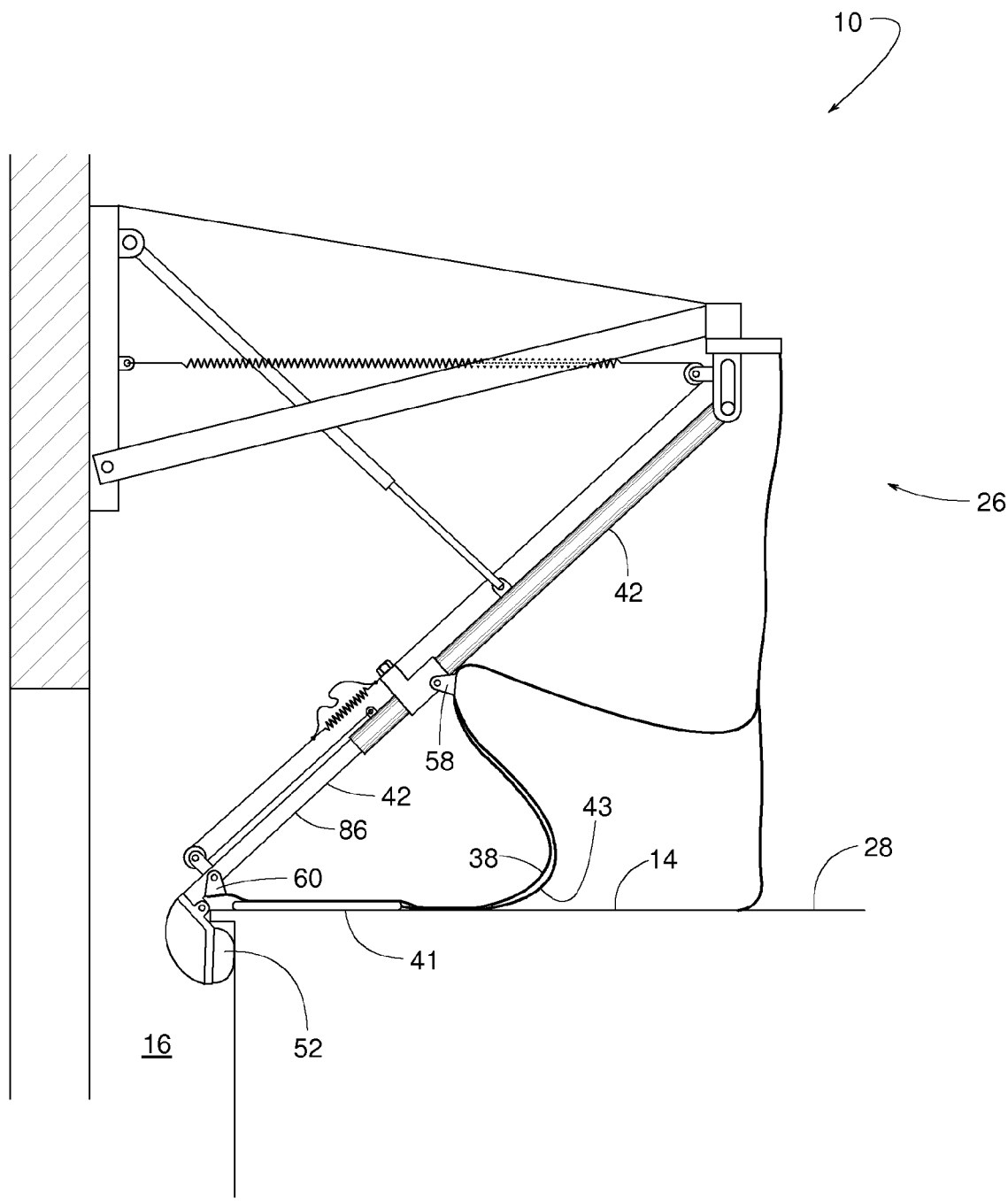
FIG. 6 is a cross-sectional view similar to FIG. 5 but showing the vehicle at a lower position than illustrated in FIGS. 1-5.
Figure 13:
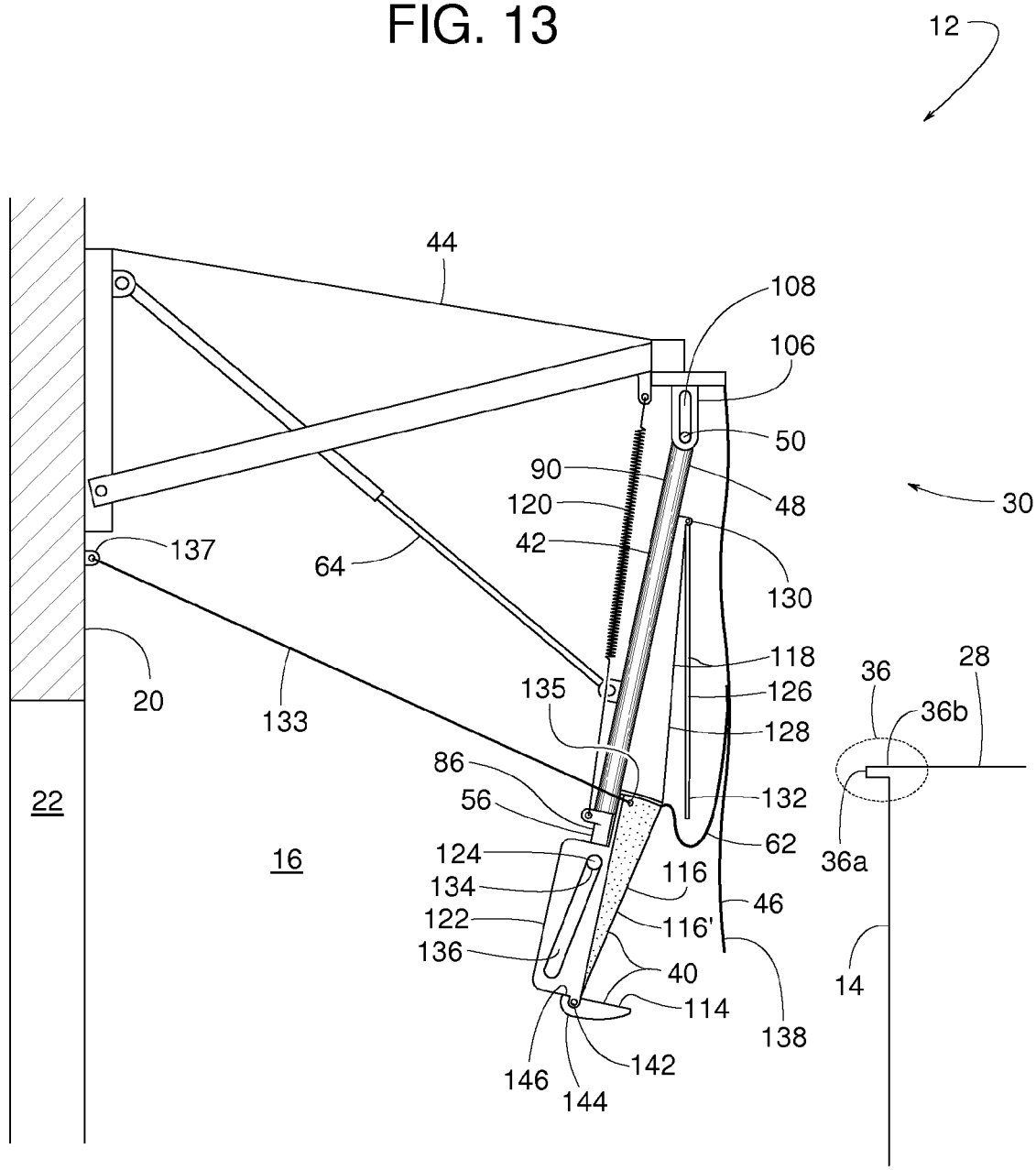
FIG. 13 is a cross-sectional view similar to FIG. 2 but showing another example weather barrier apparatus constructed in accordance with the teachings disclosed herein. The example weather barrier apparatus of FIG. 13 is shown in a relaxed configuration with a vehicle at a departed position.

More specifically, FIGS. 1 and 2 show example weather barrier apparatus 10 in a relaxed configuration with vehicle 14 in a departed position separated from weather barrier apparatus 10. FIGS. 5 and 6 show examples of weather barrier apparatus 10 in an activated configuration with vehicle 14 in a parked position engaging weather barrier apparatus 10. FIG. 13 shows example weather barrier apparatus 12 in a relaxed configuration with vehicle 14 in a departed position separated from weather barrier apparatus 12. And FIGS. 16-19 show examples of weather barrier apparatus 12 in an activated configuration with vehicle 14 in a parked position engaging weather barrier apparatus 12.

FIGS. 1-7 show weather barrier apparatus 10 comprising an example header structure 26 for sealing against a roof 28 of vehicle 14, and FIGS. 13-20 show weather barrier apparatus 12 comprising an alternate example header structure 30. In some examples, weather barrier apparatuses 10 and 12 also include some type of side sealing structure 32 for sheltering or sealing against either a vertical rear edge 34 of vehicle 14 and/or a side panel 37 of vehicle 14. Examples of side panel 37 include, but are not limited to, an outward facing surface of an open rear door and a sidewall of a trailer or truck. Side sealing structure 32 is schematically illustrated to represent various examples including, but not limited to, a compressible foam pad of a dock seal, an inflatable seal member, a resiliently deflectable panel of a dock shelter, and various combinations thereof.

Figure 11:
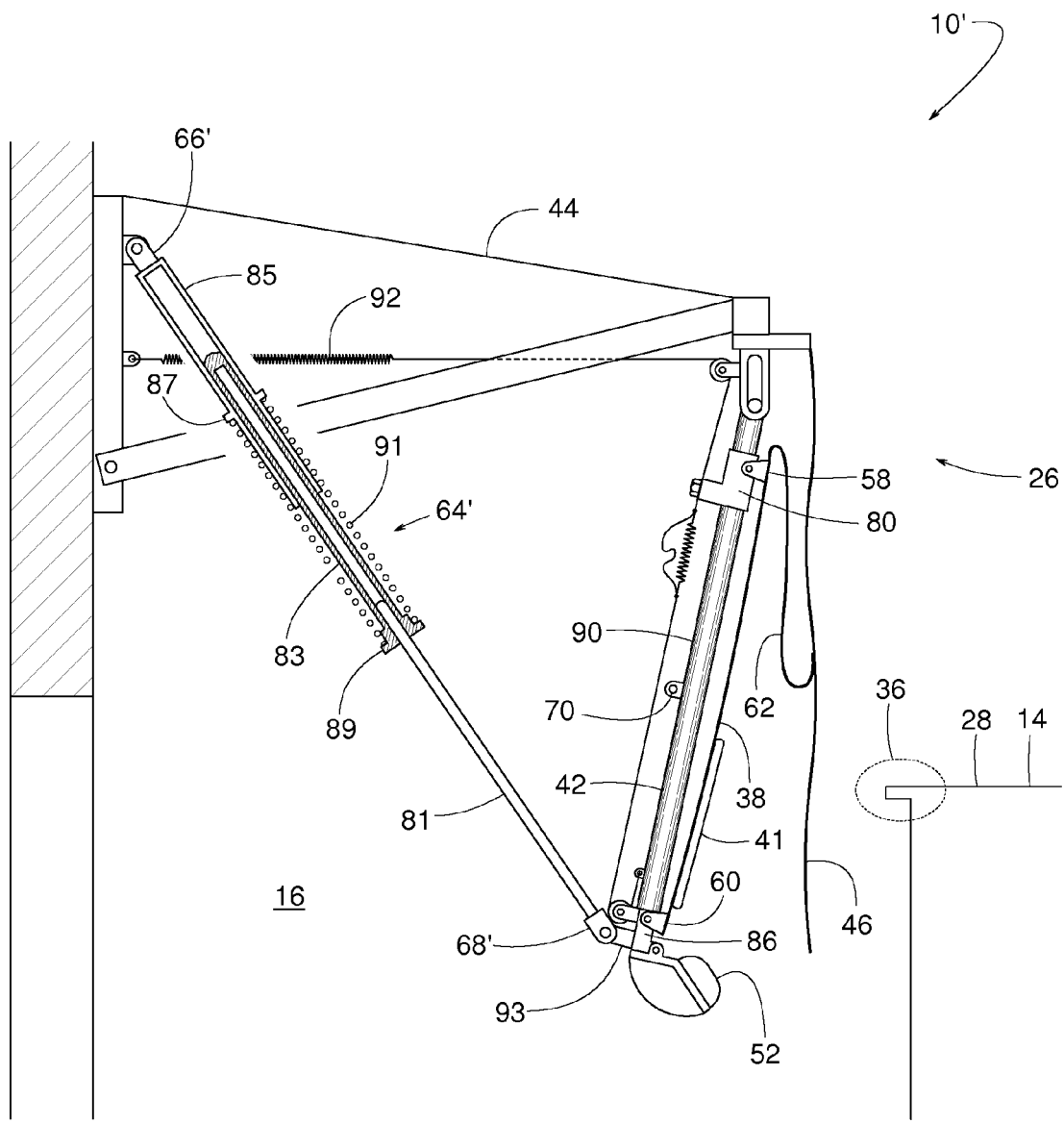
FIG. 11 is a cross-sectional view similar to FIG. 2 but showing another example weather barrier apparatus constructed in accordance with the teachings disclosed herein.
Figure 12:
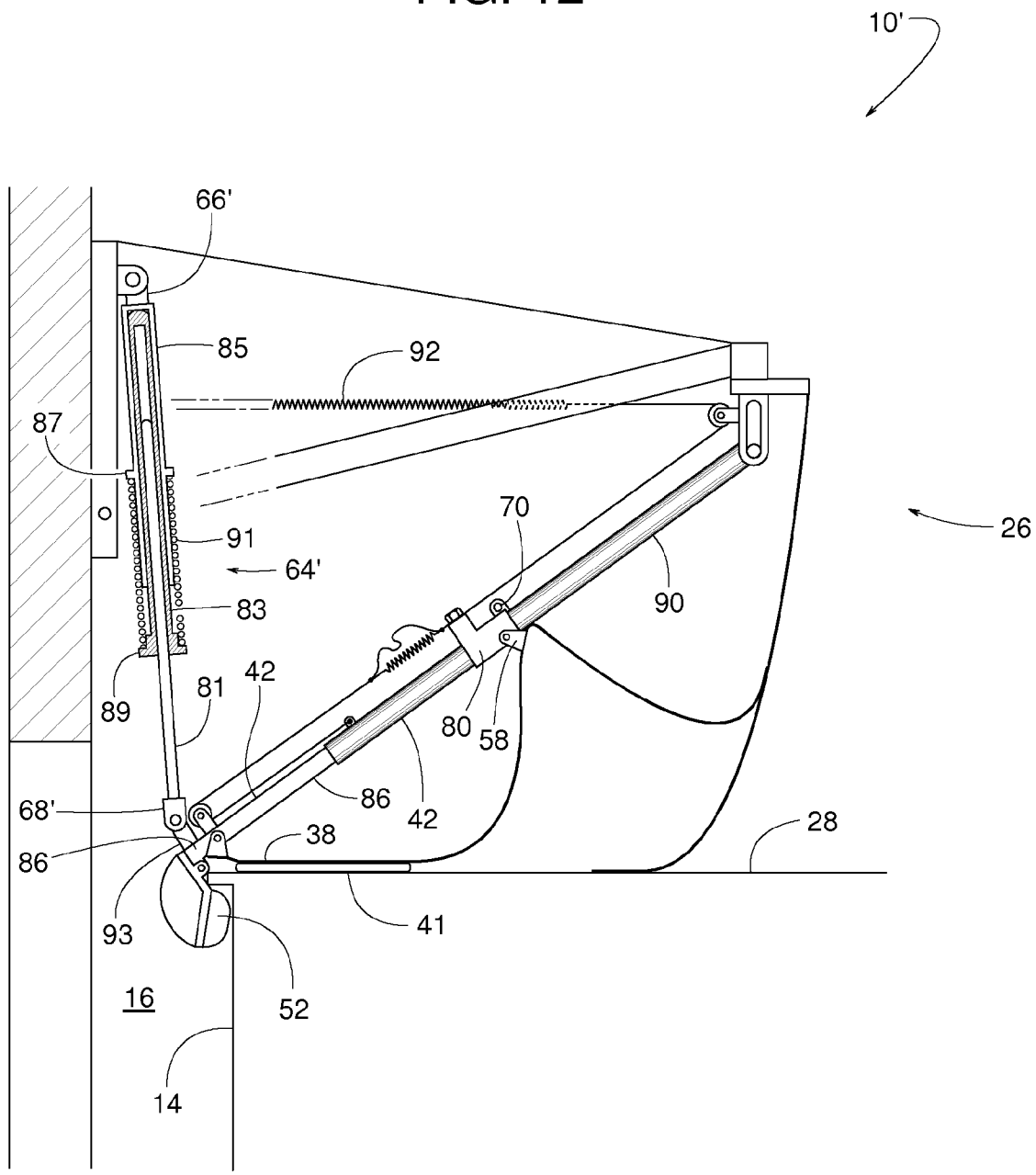
FIG. 12 is a cross-sectional view similar to FIG. 5 but showing the example weather barrier apparatus of FIG. 11.

To seal against the vehicle's roof 28, header structure 26 of FIGS. 1-7 includes an example seal member 38 in the form of an expanding bulb, and header structure 30 of FIGS. 13-20 includes an example seal member 40 comprising a compressible member. Rather than relying on gravity alone to set seal members 38 and 40, vehicle 14 backing into weather barrier apparatus 10 or 12 generates a force that expands the expanding bulb (seal member 38) or presses the compressible portion of seal member 40 forcibly down against the vehicle's roof 28. For enhanced sealing between seal member 38 and roof 28, some examples of header structure 26 includes a seal pad 41 that becomes compressed between seal member 38 and roof 28 when weather barrier apparatus 10 is in the activated configuration (e.g., FIGS. 4-6). Examples of seal pad 41 include, but are not limited to, resiliently compressible foam, pleated sheet, etc. In some examples, a pad hanger 43 (e.g., pliable sheet, straps, cables, etc.) suspends seal pad 41 in front of seal member 38, as shown in FIG. 2. In some examples, seal pad 41 is attached directly to seal member 38, as shown in FIGS. 11 and 12. In the illustrated examples, seal pad 41 covers or overlies only part of seal member 38. In other examples, seal pad 41 extends across the entire surface of seal member 38.

In some examples, header structures 26 and 30 include a spring biased extendable swing arm 42 that properly aligns seal members 38 and 40 to vehicle 14 and maintains sufficient sealing force over broad ranges of vehicle heights, lateral vehicle positions, and vehicle separation distances from doorway 22. The alignment and positive sealing features of header structures 26 and 30 provide weather barrier apparatuses 10 and 12 with improved capability of stopping rain infiltration, blocking airflow and light, all while accommodating a wide range of trailer heights and positions.

Figure 3:
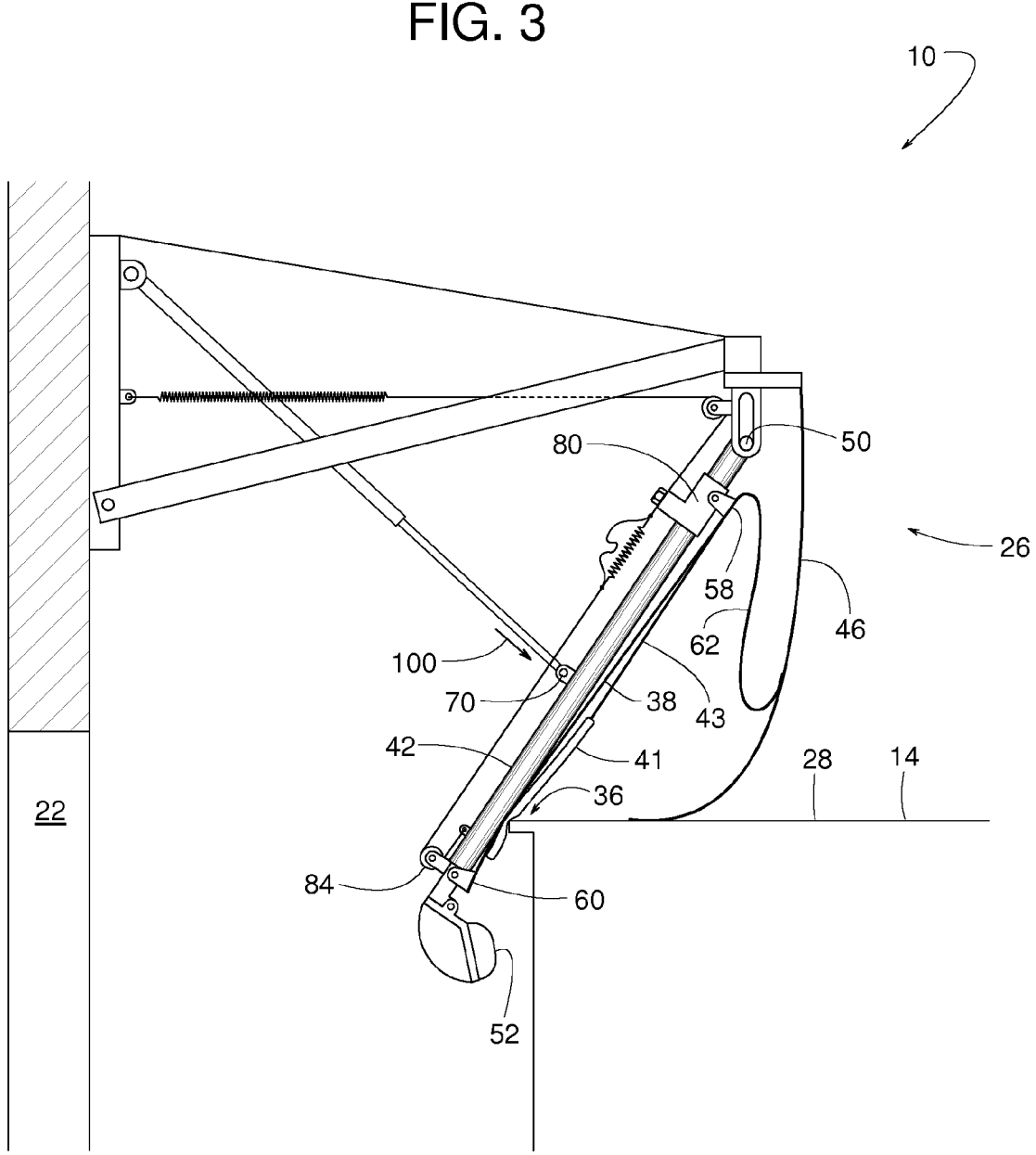
FIG. 3 is a cross-sectional view similar to FIG. 2 but showing the vehicle at a position of initial engagement with the example weather barrier apparatus of FIGS. 1-2.

Although the structure of weather barrier apparatuses 10 an 12 may vary in other examples, in the expanding-bulb example illustrated in FIGS. 1-7, example components of header structure 26 include a pliable upper canopy 67, two pliable end caps 65, an upper support member 44 attached to wall 20, and a front curtain 46 hanging from upper support member 44. To provide upper support member 44 with the ability to restorably yield in the event of an impact from a vehicle, some examples of upper support member 44, as shown in FIG. 2, include a frame member 39 pivotal about a pin 45. Additional example components of header structure 26 include swing arm 42 with an upper end 48 coupled at an upper pivot point 50 to upper support member 44, a catch 52 connected at a lower pivot point 54 on a lower end 56 of swing arm 42, expandable seal member 38 extending between an upper point of attachment 58 and a lower point of attachment 60 of swing arm 42, a back membrane 62 extending between front curtain 46 and expandable seal member 38, an extendable brace 64 having one end 66 connected to upper support member 44 and an opposite end 68 connected to an intermediate point 70 on swing arm 42, and a return mechanism 72 for urging swing arm 42 to its retracted position (FIGS. 1-3). For sealing integrity, some examples of header structure 26 have end caps 65 attached to front curtain 46 and pliable upper canopy 67. In addition to swing arm 42 being extendable between a retracted position (FIGS. 1-3, 7, 11, 13-16 and 20) and various extended positions (FIGS. 4-6, 12 and 17-19), swing arm 42 is pivotal about upper pivot point 50 between a forward position (FIGS. 1, 2, 11, 13-14 and 20) and various deflected positions (FIGS. 3-7, 12, and 15-19).

In some examples, return mechanism 72 comprises a flexible elongate member 74 (e.g., cable, non-elastic strap, elastic strap, cord, rope, wire, chain, etc.) extending from an anchor point 76, passing through an upper sheave 78, fixed to a slider 80 of swing arm 42 (e.g., a fastener 82 affixes elongate member 74 to slider 80), passing around a lower sheave 84 on an extending arm portion 86 of swing arm 42, and terminating at a point 88 on a non-extending arm portion 90 of swing arm 42. In some examples, flexible elongate member 74 includes a main return spring 92 (e.g., an extension spring) that creates a force 94 urging swing arm 42 to its retracted position.

In some examples, elongate member 74 also includes a secondary take-up spring 96 (e.g., an extension spring) that provides elongate member 74 with limited additional length under certain high stress conditions. If slider 80, for example, bottomed-out at its lower end-of-travel along swing arm 42 while vehicle 14 continued lengthening swing arm 42, take-up spring 96 could stretch to add some additional length to the section of elongate member 74 that extends between slider 80 and point 88. To protect spring 96 from being over stretched under such conditions, some examples of elongate member 74 include a short section of cable 98 connected to opposite ends of take-up spring 96. Cable section 98 is normally slack but is drawn taut by the extension of spring 96, which can only extend to the full straightened length of cable section 98.

An example operation and function of weather barrier apparatus 10 follows the sequence illustrated in FIGS. 2-7. FIG. 2 shows weather barrier apparatus 10 in a relaxed configuration with vehicle 14 approaching from a departed position. The relaxed configuration is defined as a state of the weather barrier apparatus 10 when disengaged from vehicle 14. In some examples, in the relaxed configuration, swing arm 42 hangs down to a forward position due to a combination of the weight of the swing arm 42, the weight of seal member 38, and a force 100 that brace 64 exerts against intermediate point 70 to push swing arm 42 forward. In some examples, brace 64 is telescopic or otherwise extendable, and force 100 is provided by a spring associated with brace 64. In some examples, brace 64 itself is a pneumatic spring, a coiled spring and/or a combination of a pneumatic spring and a coiled spring.

With weather barrier apparatus 10 in the relaxed configuration, as shown in FIG. 2, spring 92 pulls elongate member 74 in tension, which draws lower sheave 84 toward point 88 and draws slider 80 toward upper sheave 78. With lower sheave 84 being mounted to the extending arm portion 86 of swing arm 42 and point 88 being on the non-extending arm portion 90, the tension in elongate member 74 draws swing arm 42 to its retracted position (FIGS. 1-3). With swing arm 42 fully retracted, expandable seal member 38 extending between point 60 on the swing arm's lower end 56 and point 58 on slider 80, and the tension in elongate member 74 urging slider 80 up toward upper sheave 78 while point 60 is stationary relative to swing arm 42, elongate member 74 pulls expandable seal member 38 in tension, thereby urging seal member 38 to a more-flattened state, as shown in FIG. 2.

Figure 4:
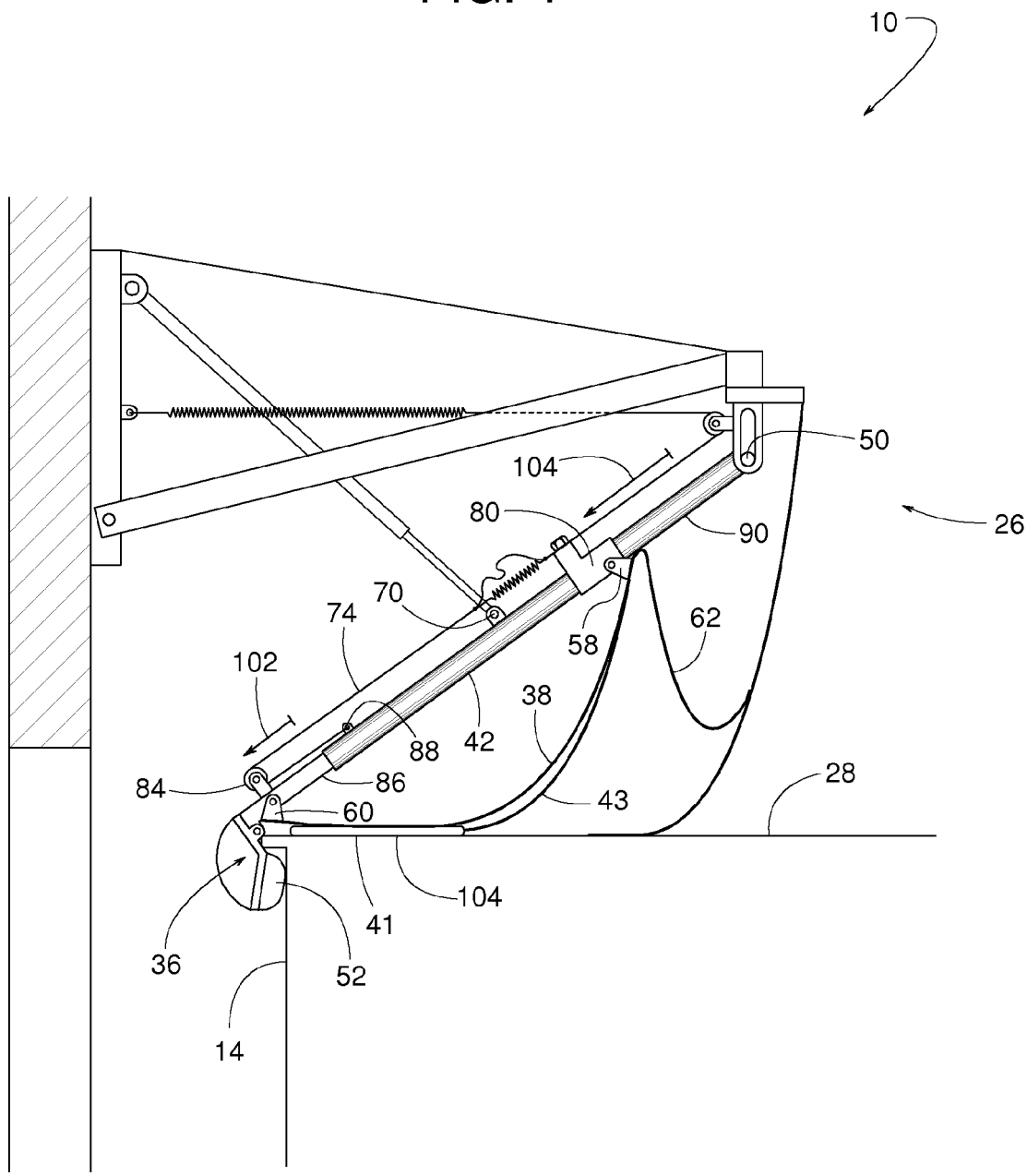
FIG. 4 is a cross-sectional view similar to FIG. 3 but showing the vehicle farther into the example weather barrier apparatus of FIGS. 1-3.

In some examples, expandable seal member 38 is a sheet of material that is sufficiently flexible to repeatedly bend between a more-flattened state (FIGS. 2, 3 and 7) and various bulging, less-flattened states (FIGS. 4, 5 and 6). In addition, in some examples, expandable seal member 38 is of a sheet of material that when bulging to a less-flattened state is sufficiently stiff to exert significant sealing pressure against the vehicle's roof 28. In some examples, seal member 38 is made of a High Molecular Weight (HMW) polyethylene for its toughness even when relatively cold. Seal member 38 being in a more-flattened state or a less-flattened state, with respect to swing arm 42, influences how far seal member 38 forcibly bulges, forcibly bows or otherwise forcibly expands away from swing arm 42, wherein seal member 38 forcibly expands farther from swing arm 42 when seal member 38 is in a less-flattened state than when seal member 38 is in a more-flattened state. The term, "forcibly" refers to an impetus in excess of gravity alone.

FIG. 3 shows the initial reaction of weather barrier apparatus 10 as the vehicle's upper rear edge 36 first engages header structure 10. During initial contact, the vehicle's upper rear edge 36 effectively engages seal member 38. The term, "effectively engages" (and derivatives thereof) as used with reference, for example, to a seal member effectively engaging a vehicle means that the seal member either touches the vehicle directly or with some intermediate element (e.g., front curtain 46, seal pad 41, pad hanger 43, and/or back membrane 62) interposed in compression between the seal member and the vehicle. During initial engagement, vehicle 14 pushes seal member 38 and swing arm 42 back toward doorway 22. The vehicle's backward pushing force overcomes the brace's spring force 100 applied to the swing arm's intermediate point 70, so vehicle 14 forces seal member 38 and swing arm 42 to rotate back about upper pivot point 50. Vehicle 14 eventually pushes swing arm 42 to a deflected position shown in FIG. 4.

As vehicle 14 moves from the position of FIG. 3 to that of FIG. 4, the vehicle's upper rear edge 36 slides along seal member 38 until the vehicle's upper rear edge 36 engages catch 52. After engaging catch 52, continued rearward travel of vehicle 14 extends swing arm 42. As swing arm 42 lengthens, lower sheave 84 and attachment point 60 move a certain distance 102 away from point 88 while slider 80 and attachment point 58 move a greater distance 104, for example, twice that of distance 102 due to the arrangement of elongate member 74 and sheave 84. The difference in travel distance (distance 80 minus distance 102) of the expandable seal's attachment points 58 and 60 results in points 58 and 60 moving closer together. This causes seal member 38 to expand away from swing arm 42 and press a surface seal 104 of seal member 38 against the vehicle's roof 28 as swing arm 42 extends. Seal member 38 is closer to upper pivot point 50 when weather barrier apparatus 10 is in the relaxed configuration than when weather barrier apparatus 10 is in the activated configuration.

As vehicle 14 continues moving back from the position shown in FIG. 4 to the position shown in FIG. 5, swing arm 42 continues extending, which forces seal member 38 to continue expanding. In some examples, slider 80 has an upper clearance slot or open section that enables slider 80 to travel past intermediate point 70. If vehicle 14 enters dock 16 at a lower elevation or vehicle 14 descends from its height shown in FIG. 5 to that of FIG. 6, swing arm 42 responds by further extending in those situations as well. Further extension of swing arm 42 leads to further expansion of seal member 38. Thus, the variable extension of swing arm 42 in response to the vehicle's position expands seal member 38 accordingly.

Figure 7:
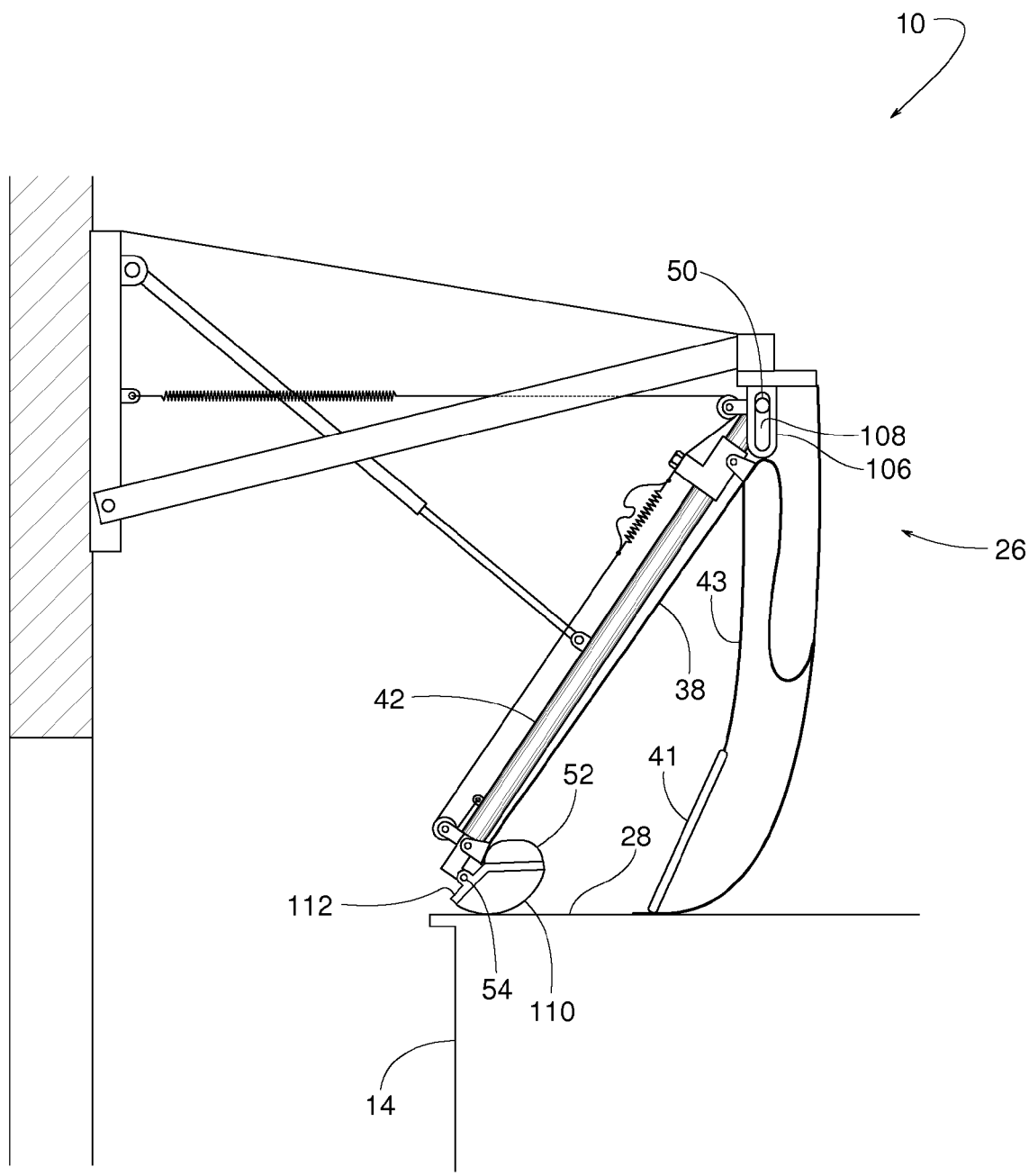
FIG. 7 is a cross-sectional view similar to FIGS. 2-6 but showing the example weather barrier apparatus of FIGS. 1-6 responding to a jam condition.

In some examples, header structure 26 includes means for mitigating a jam in which vehicle 14 is driven underneath catch 52, as shown in FIG. 7. To prevent such a jam from damaging header structure 26 or vehicle 14, some examples of header structure 26 include an upper bracket 106 and/or lower pivot point 54. Bracket 106 has a slot 108 along which upper pivot point 50 can travel to provide swing arm 42 with additional vertical clearance above the vehicle's roof 28. Lower pivot point 54 allows catch 52 to pivot forward to add further clearance above roof 28 and/or to position a curved sliding surface 110 of less drag against roof 28. A back edge 112 on catch 52 provides catch 52 with a limited range of rotation about pivot point 54.

Figure 8:
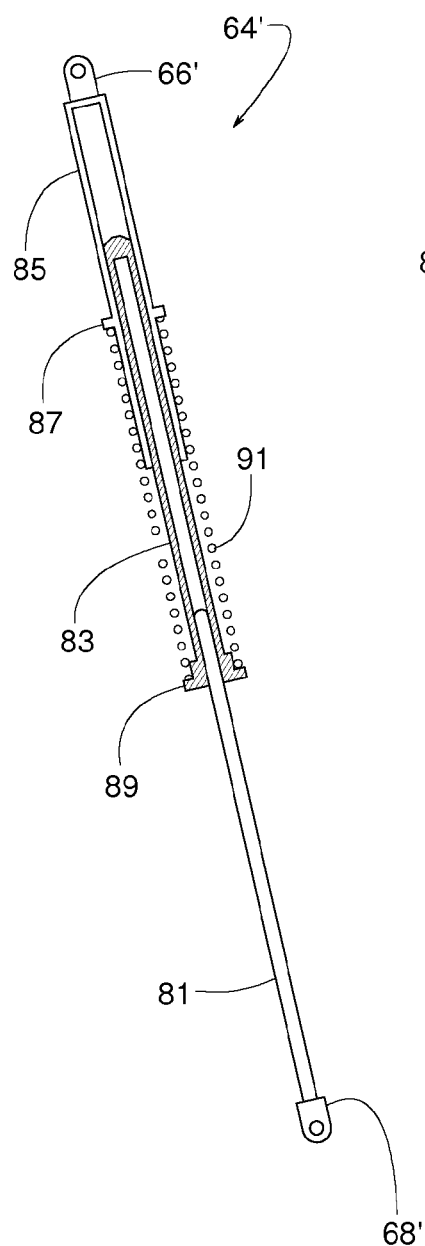
FIG. 8 is a cross-sectional view of an example brace constructed in accordance with the teachings disclosed herein.
Figure 9:
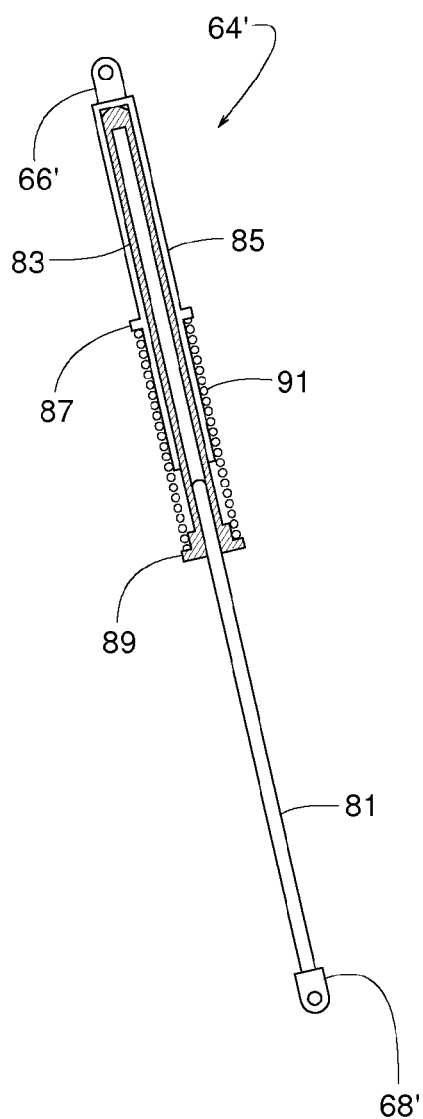
FIG. 9 is a cross-sectional view similar to FIG. 8 but showing the example brace partially compressed.
Figure 10:
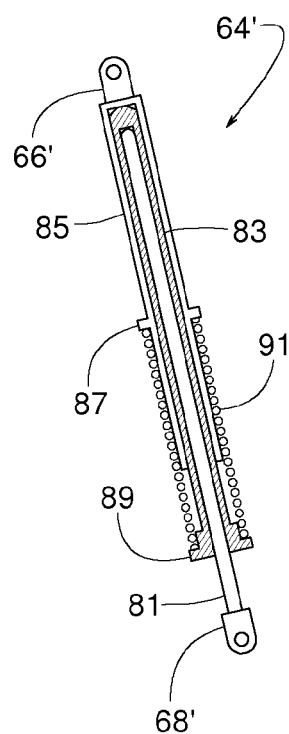
FIG. 10 is a cross-sectional view similar to FIG. 9 but showing the example brace compressed even further.

To provide brace 64 with a greater range of extendable lengths within a limited distance between the brace's opposite ends of attachment (e.g., ends 66 and 68) and to exert a more directly applied downward force against seal 38, some examples of brace 64 include more than two telescopic elements within a single brace. FIGS. 8-12, for instance, shows an example brace 64' comprising a rod 81 telescopically fitted within a cylinder 83, which in turn is telescopically fitted within a tube 85. Rod 81 and cylinder 83 is a pneumatic spring. A first collar 87 is fixed to tube 85, and a second collar 89 is fixed to cylinder 83. A compression spring 91 between collars 87 and 89 urges cylinder 83 to its fully extended position relative to tube 85, as shown in FIGS. 8 and 11. Consequently, cylinder 83 can extend variably from tube 85, and rod 81 can extend variably from cylinder 83 to provide a broad range of overall extendable lengths between the brace's opposite ends 66' and 68'. FIG. 8 shows brace 64' fully extended, FIG. 9 shows brace 64' partially extended, and FIG. 10 shows brace 64' at its minimum length. FIGS. 9 and 10 show that after cylinder 83 bottoms out within tube 85, spring 91 is at its minimum length, but rod 81 still has room to retract within cylinder 83.

In some examples, brace 64' replaces brace 64 in weather barrier apparatus 10. In some examples, brace 64' is attached to another example such as, for example, weather barrier apparatus 10' illustrated in FIGS. 11 and 12. Weather barrier apparatus 10' is similar to weather barrier apparatus 10, and positions of the weather barrier apparatus 10' illustrated in FIGS. 11 and 12 are similar to positions of weather barrier apparatus 10 illustrated in FIGS. 2 and 5, respectively. With weather barrier apparatus 10', however, instead of brace 64 connecting to point 70 on the non-extending arm portion 90 of swing arm 42 (FIGS. 1-7), a bracket 93 connects the lower end 68' of brace 64' to the swing arm's extending arm portion 86 (FIGS. 11-12). The greater extendibility of multi-telescopic brace 64' enables coupling of lower end 68' to the swing arm's extending arm portion 86 without having to have an extra high header to contain an otherwise extra long single telescopic brace. Lower end 68' being at the point of attachment shown in FIGS. 11 and 12 places brace 64' at a near vertical position to exert a more directly applied downward force against seal 38 when weather barrier apparatus 10' is in an activated configuration, as shown in FIG. 12.

In the examples shown in FIGS. 13-20, header structure 30 comprises upper support member 44 attached to wall 20, swing arm 42 with upper end 48 pivotally coupled to upper support member 44, front curtain 46 hanging from upper support member 44, seal member 40 with a catch 114 for engaging the vehicle's upper rear edge 36 and a foot 116 for compressively sealing against the vehicle's roof 28 and/or against the vehicle's upper rear edge 36, a skid member 118 for guiding the vehicle's upper rear edge 36 onto foot 116, back membrane 62 extending between seal member 40 and front curtain 46, a spring 120 (e.g., an extension spring) for retracting swing arm 42 to its minimum length, brace 64 for urging swing arm 42 forward and down. In some examples, a shiftable connection 122 couples seal member 40 to a lower pivot point 124 on the swing arm's lower end 56. Shiftable connection 122 (which will be explained later in greater detail) eases the disengagement of seal member 40 from the vehicle's roof 28 as vehicle 14 departs dock 16.

An example operation of header structure 30 follows the sequence illustrated in FIGS. 13-19. FIG. 13 shows vehicle 14 in the departed position backing toward header structure 30. During the approach, weather barrier apparatus 12 is in the relaxed configuration with vehicle 14 is at a departed position separated from weather barrier apparatus 12. In the relaxed configuration, swing arm 42 hangs down to a forward position due to a combination of the swing arm's weight, the weight of seal member 40 and the force of brace 64 pushing swing arm 42 forward.

Figure 14:
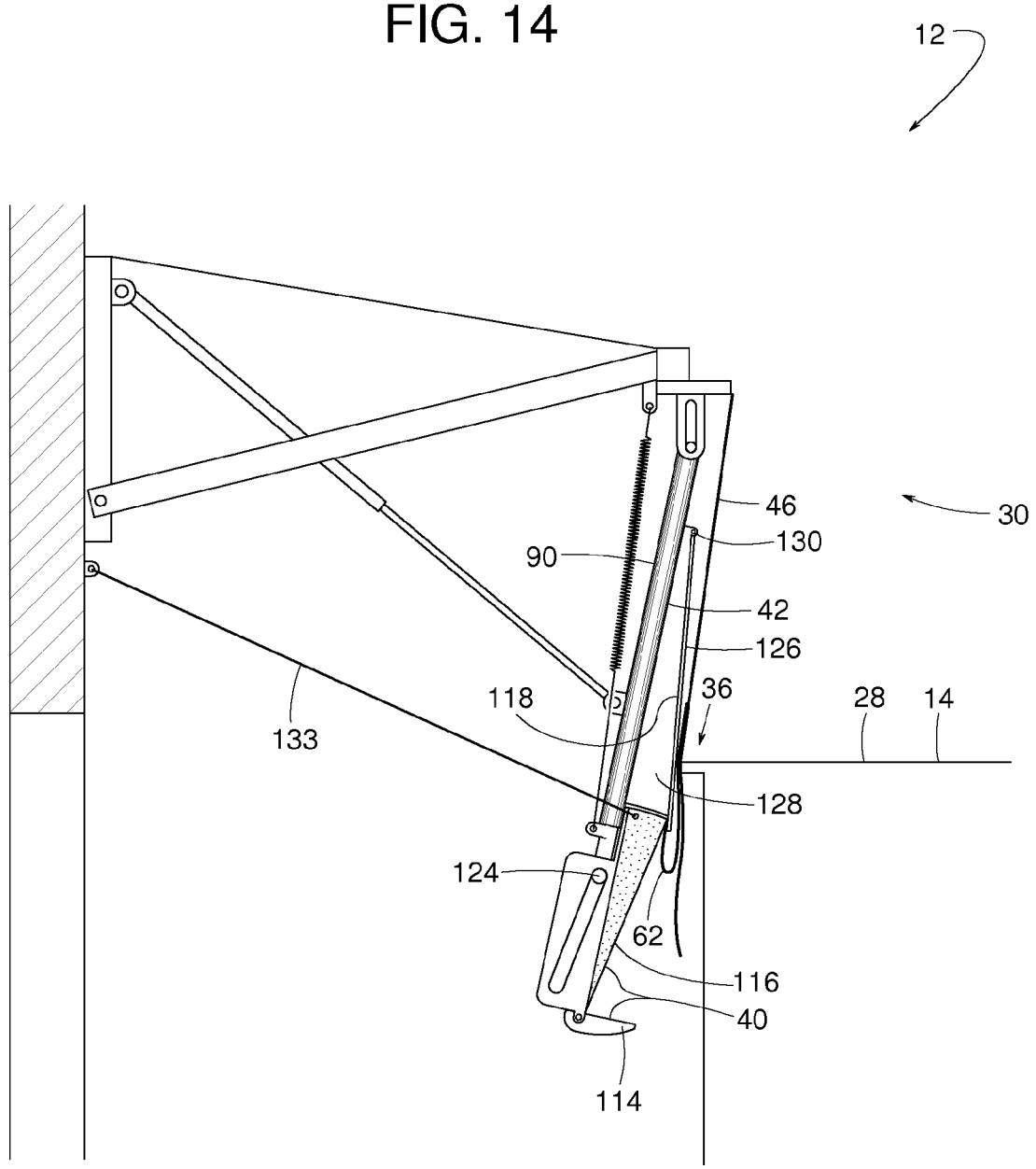
FIG. 14 is a cross-sectional view similar to FIG. 13 but showing the vehicle at a position of initial engagement with the example weather barrier apparatus of FIG. 13.
Figure 15:
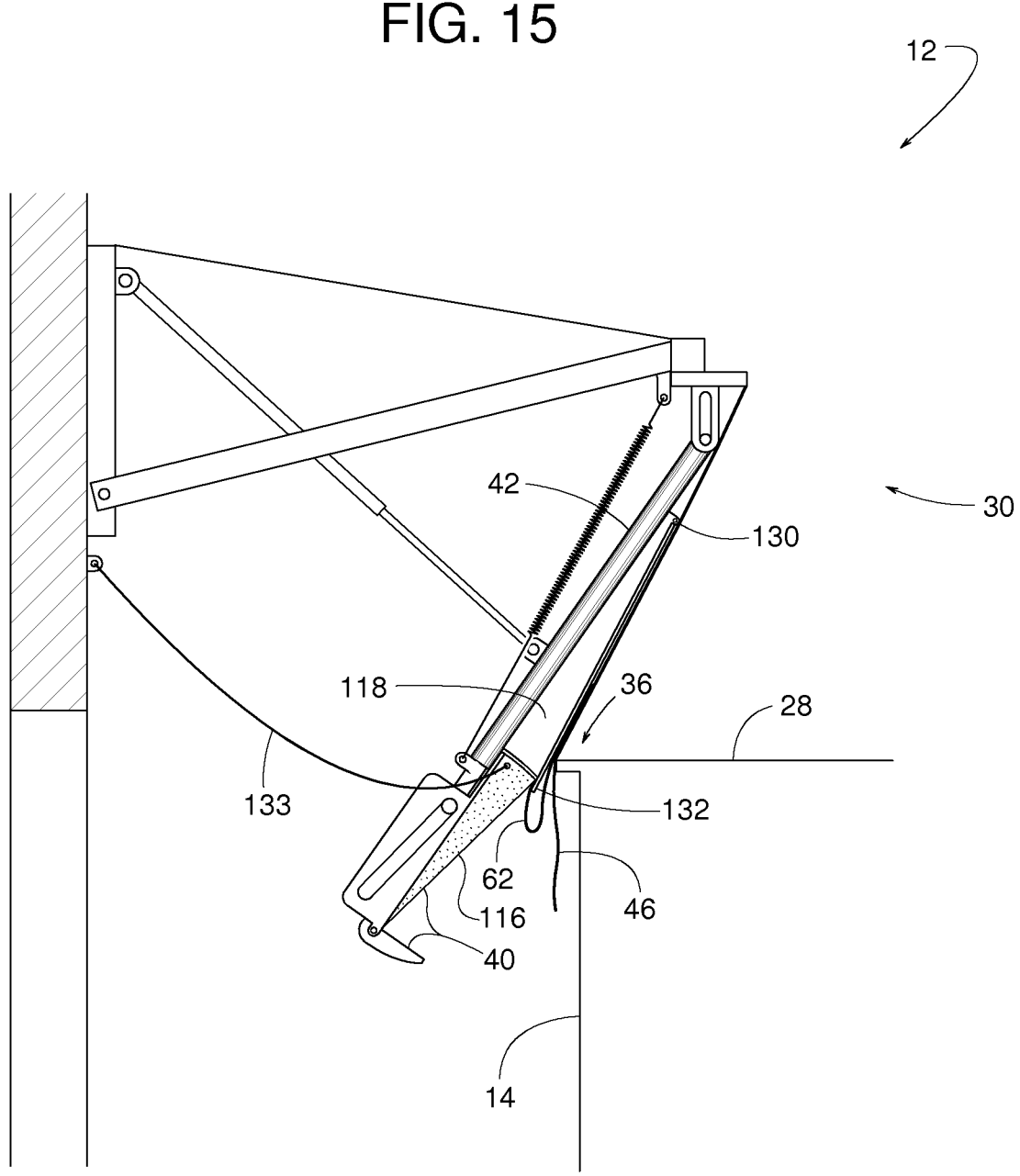
FIG. 15 is a cross-sectional view similar to FIG. 14 but showing the vehicle farther into the example weather barrier apparatus of FIGS. 13-14.

FIG. 14 shows the initial reaction of weather barrier apparatus 12 as the vehicle's upper rear edge 36 first engages header structure 30. During initial contact, the vehicle's upper rear edge 36 pushes front curtain 46, back membrane 62 and a pivoting guide rail 126 of skid member 118 back against a back support 128 of skid member 118. As vehicle 14 continues moving back after initial contact, vehicle 14 pushes swing arm 42 back while the vehicle's upper rear edge 36 slides along skid member 118 toward seal member 40, as shown in FIG. 15. In some examples, skid member 118 comprises guide rail 126 (FIG. 14) pivotally connected to the skid member's back support 128 at a pivot point 130. Guide rail 126 has a vehicle edge guiding surface 132 that leads the vehicle's upper rear edge 36 onto the seal member's foot 116.

Figure 16:
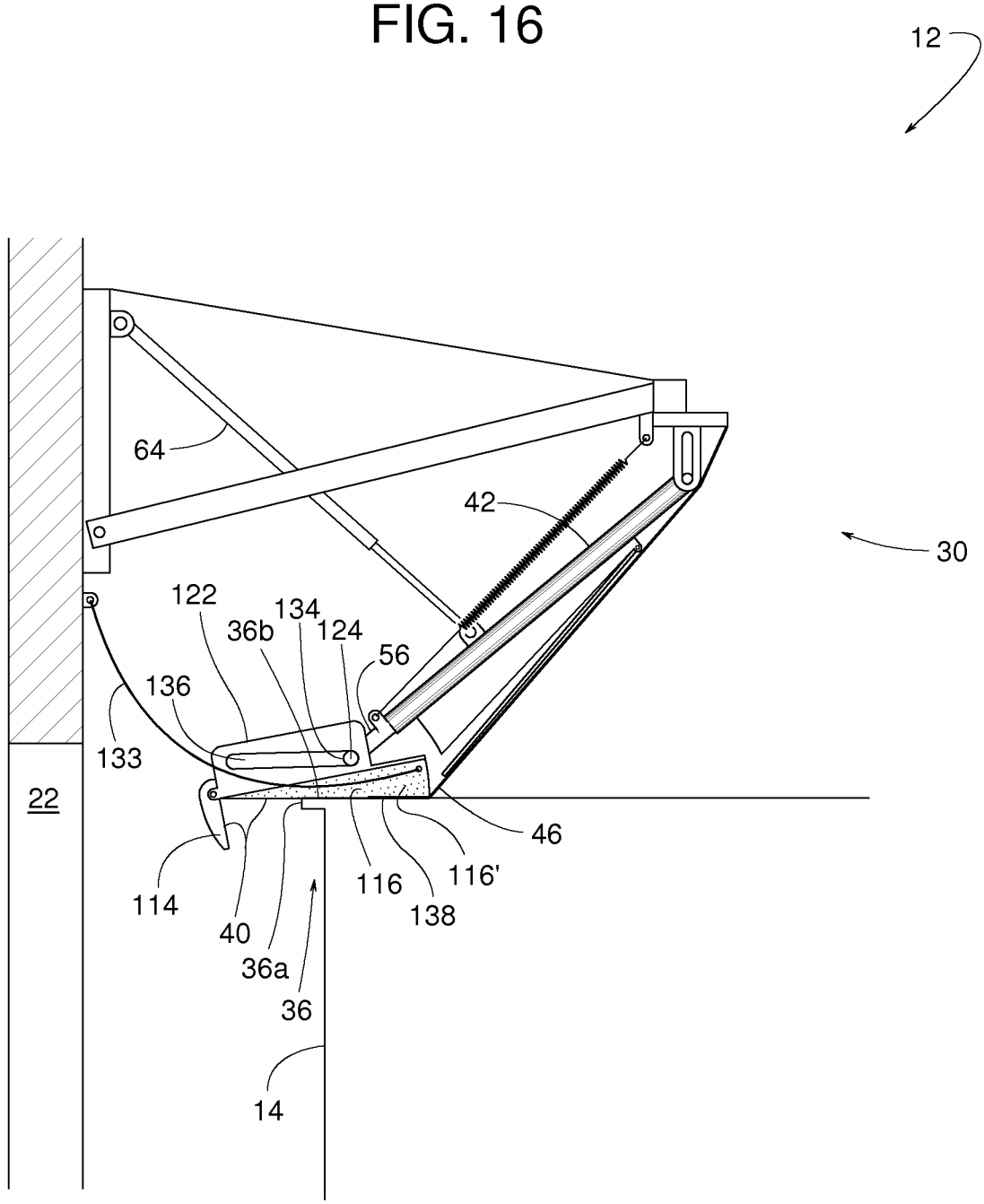
FIG. 16 is a cross-sectional view similar to FIG. 15 but showing the vehicle even farther into the example weather barrier apparatus of FIGS. 13-15.

As vehicle 14 continues moving back from the position shown in FIG. 15, the vehicle's upper rear edge 36 slides from skid member 118 onto foot 116. When the vehicle's upper rear edge 36 travels past the swing arm's lower pivot point 124, as shown in FIG. 16, brace 64 pushing against swing arm 42 causes the seal member's foot 116 to rotate to be substantially flat onto and/or flush with the vehicle's roof 28 in the area of upper rear edge 36. Upper rear edge 36 is a general region comprising a rear portion 36a and a top portion 36b. Rear portion 36a generally faces toward doorway 22, and top portion 36b faces generally upward in the orientation of FIG. 16. In some examples, pivotal point 124 includes an element 134 on the swing arm's lower end 56, wherein element 134 can pivot within and travel along a slot 136 in shiftable connection 122. Examples of element 134 include, but are not limited to, a pin protruding laterally from lower end 56, a cam follower, a roller bearing, and various combinations thereof.

Seal member 40 rotating onto the vehicle's roof 28, as shown in FIG. 16, places the seal's foot 116 in effective engagement with roof 28. In some examples, foot 116 engages roof 28 directly, and in other examples, a lower end 138 of front curtain 46 becomes compressively interposed between foot 116 and roof 28. In some examples, foot 116 comprises a sealing element 116' (e.g., a foam pad, loop of flexible material, etc.) that compliantly seals against top portion 36b of the vehicle's upper rear edge 36. In some examples, sealing element 116' is a polyurethane open cell foam pad.

Figure 17:
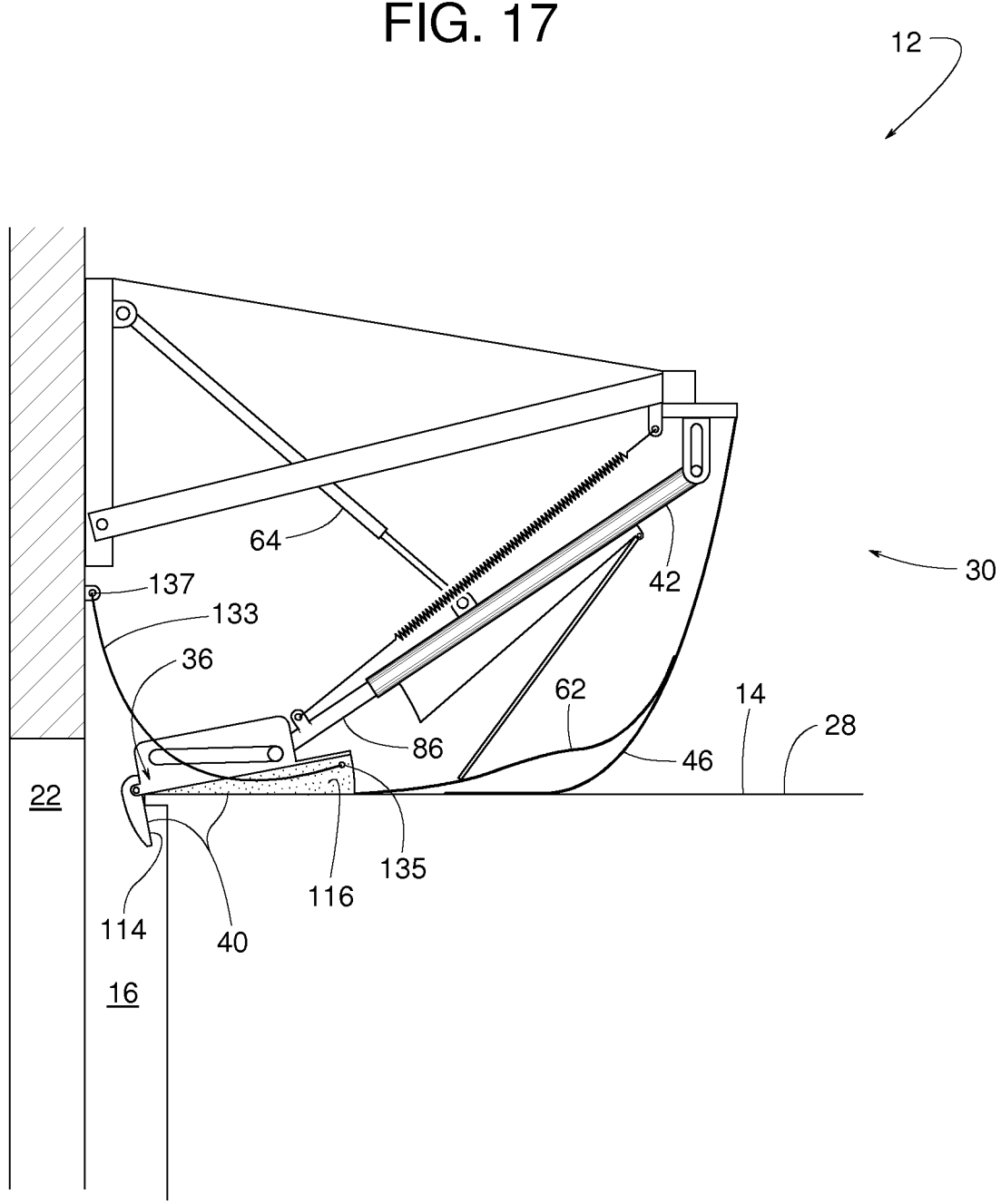
FIG. 17 is a cross-sectional view similar to FIG. 16 but showing the vehicle even farther into the example weather barrier apparatus of FIGS. 13-16.

As vehicle 14 continues moving back from the position shown in FIG. 16, the vehicle's upper rear edge 36 eventually engages catch 114. With edge 36 engaging catch 114, further rearward movement of vehicle 14 extends swing arm 42, as shown in FIG. 17. FIG. 17 shows the example weather barrier apparatus 12 in an activated configuration with vehicle 14 in a parked position where cargo can be transferred between vehicle 14 and doorway 22. With the example weather barrier apparatus 12 of FIG. 17 in the activated configuration, brace 64 pushing against swing arm 42 presses the seal's foot 116 sealingly tight against the vehicle's roof 28.

Figure 18:
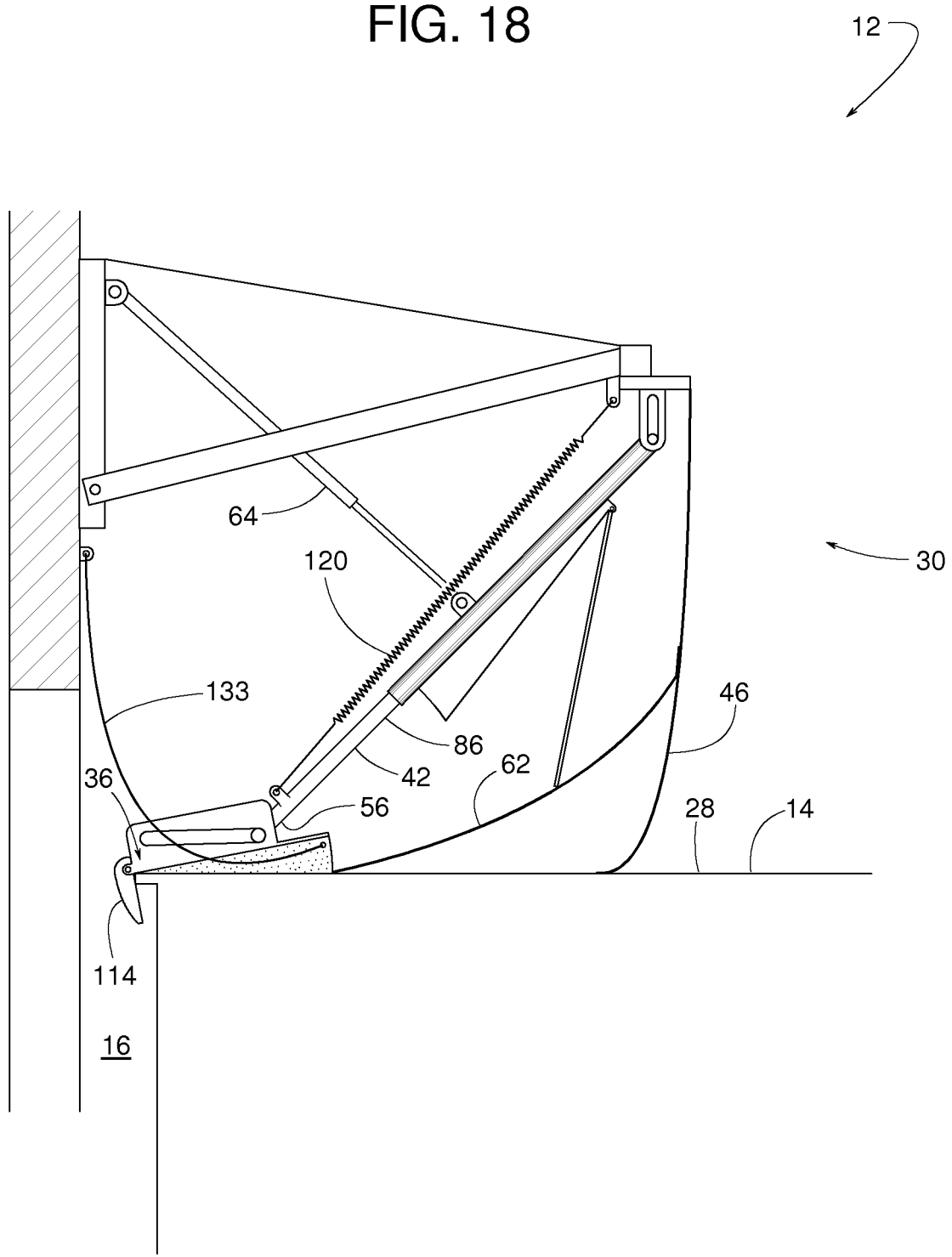
FIG. 18 is a cross-sectional view similar to FIG. 17 but showing the vehicle at a lower position than illustrated in FIGS. 13-17.

FIG. 18 shows the configuration of the example weather barrier apparatus 12 of FIGS. 13-17 when the vehicle's roof 28 is lower than the position shown in FIG. 17. This can happen when heavy cargo or a forklift enters the cargo bay of vehicle 14. In other cases, instead of vehicle 14 being at the height shown in FIG. 17, a lower vehicle might enter dock 16. When the vehicle's roof 28 descends or is otherwise at a lower position, as shown in FIG. 18, brace 64 pushes against swing arm 42 to hold seal member 40 down against the vehicle's upper rear edge 36. Swing arm 42 being extendable provides seal member 40 with a freedom of vertical travel that allows seal member 40 to follow the vertical movement of the vehicle's upper rear edge 36.

Figure 19:
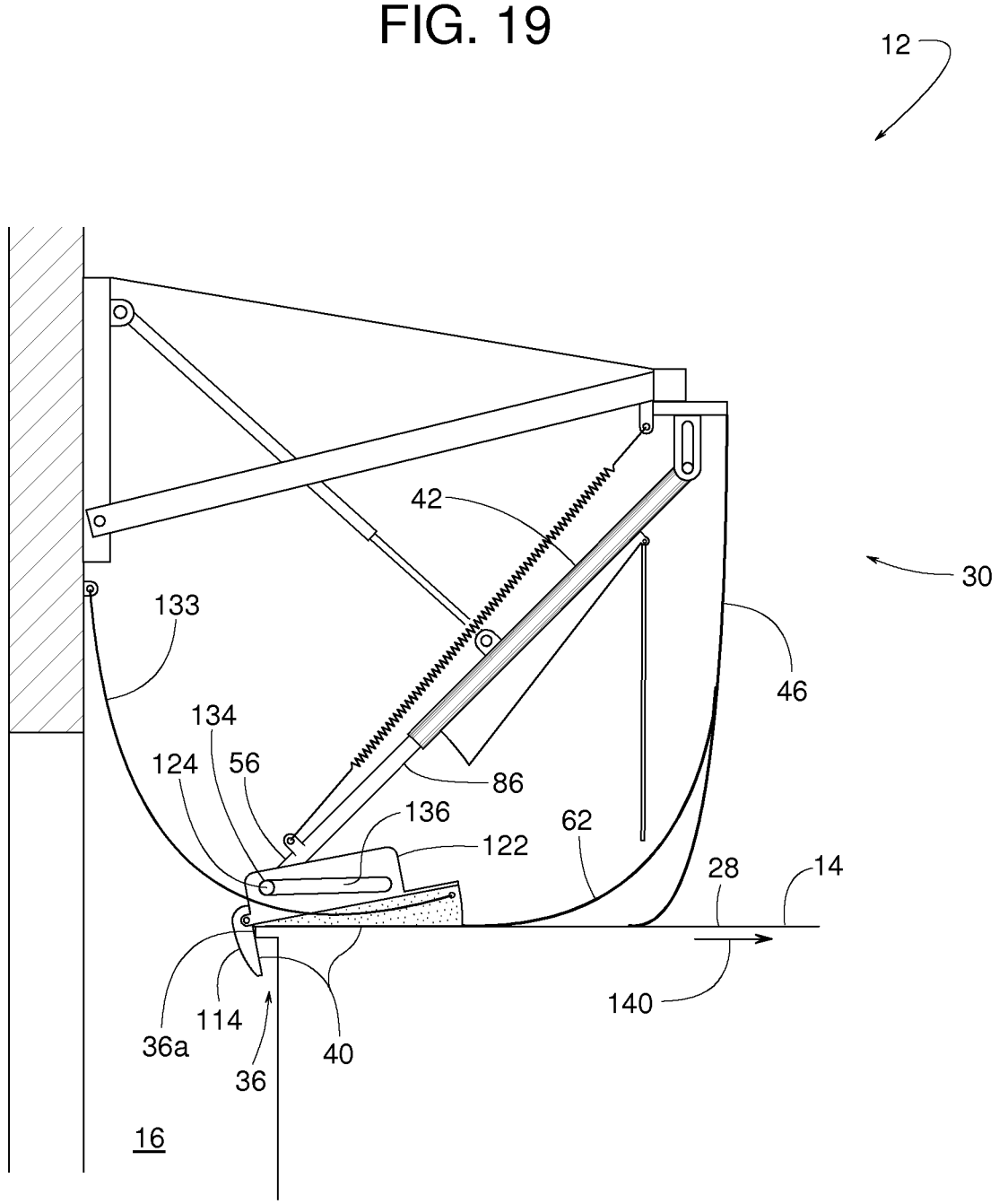
FIG. 19 is a cross-sectional view similar to FIGS. 17 and 18 but showing the vehicle departing, thereby placing the example weather barrier apparatus of FIGS. 13-18 in a departing activated configuration.

After loading or unloading vehicle 14 and as vehicle 14 begins departing dock 16, as shown in FIG. 19, the vehicle's initial forward movement 140 moves seal member 40 and shiftable connection 122 forward (e.g., to the right in the orientation of FIG. 19) as well. Lost motion (e.g., slack and/or play) of the swing arm's lower end 56 relative to shiftable connection 122 shifts the swing arm's lower end pivot point 124 to the back end of slot 136, as shown in FIG. 19.

Although FIGS. 17 and 19 show the example weather barrier apparatus 12 in the activated configuration, FIG. 17 shows the example weather barrier apparatus 12 in an arriving activated configuration, and FIG. 19 shows the example weather barrier apparatus 12 in a departing activated configuration. The shifting motion at shiftable connection 122 positions the swing arm's lower end 56 near or behind the rear portion 36a of the vehicle's upper rear edge 36, so seal member 40 readily "falls off" or disengages upper rear edge 36 as vehicle 14 departs.

To return header seal 40, and particularly its foot 116, to its nearly upright position shown in FIG. 13, some examples of header structure 30 include a seal return member 133. In some examples, the seal return member is a pliable, elongated member of fixed length extending between one point 135 on seal 40 and an anchor point 137 near the lower end of upper support member 44. Examples of seal return member 133 include, but are not limited to, a strap, a sheet of pliable material, a cable, a chain and a rope. When weather barrier apparatus 12 is in the relaxed configuration, as shown in FIG. 13, the limited linear distance between points 135 and 137 makes seal return member 133 taut such that seal return member 133 pulls foot 116 of seal 40 to its upright position. When the example weather barrier apparatus 12 is in the activated configuration, as shown in FIG. 17, the distance between points 135 and 137 is less than the overall length of seal return member 133 to enable seal return member 133 to become slack, which allows the seal's foot 116 to rotate down against the vehicle's roof 28.

Figure 20:
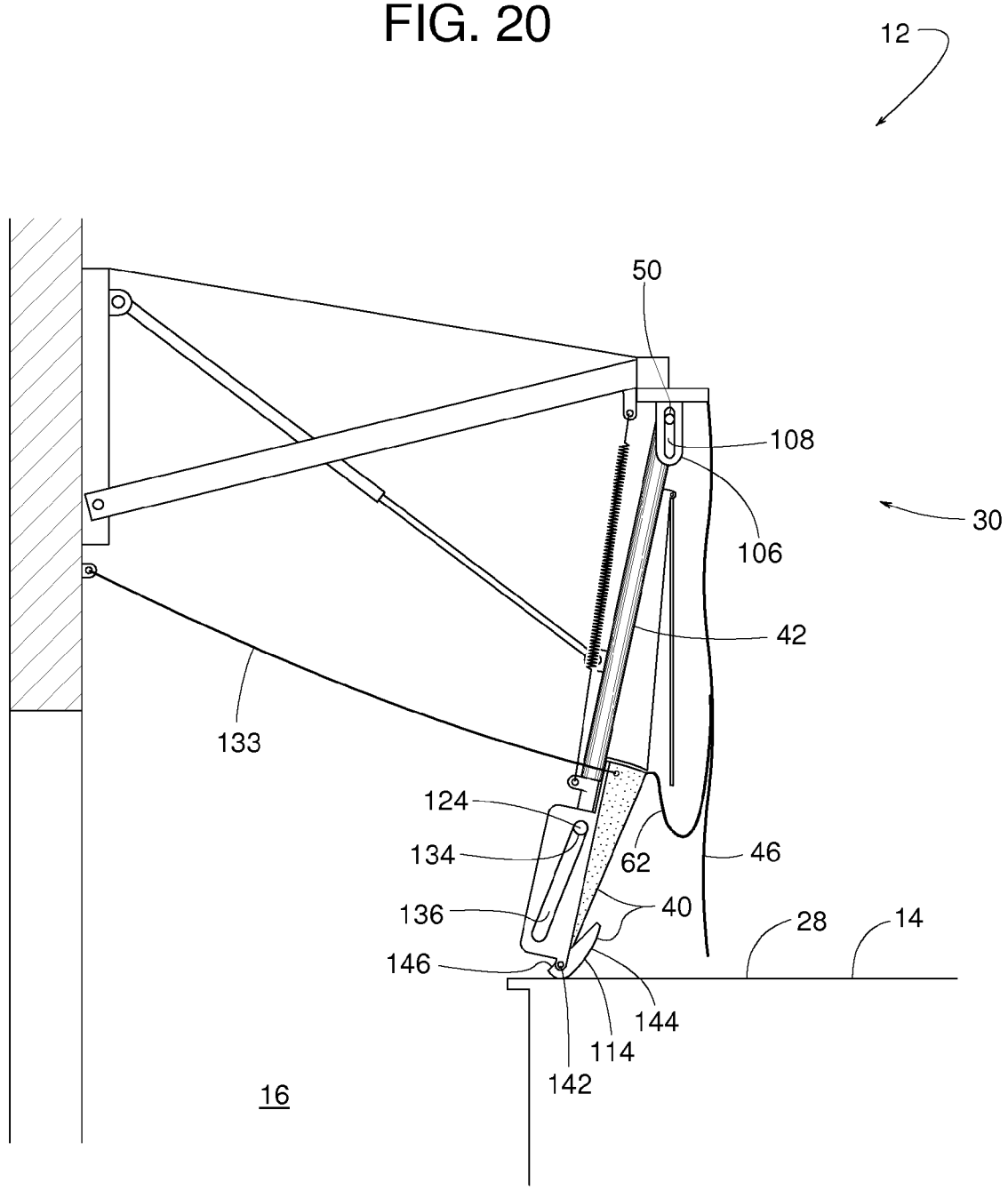
FIG. 20 is a cross-sectional view similar to FIGS. 13-19 but showing the example weather barrier apparatus of FIGS. 13-19 responding to a jam condition.

In some examples, header structure 30 includes means for mitigating a jam in which vehicle 14 is driven underneath catch 114, as shown in FIG. 20. To prevent such a jam from damaging header structure 30 or vehicle 14, some examples of header structure 30 include upper bracket 106 and/or a lower pivot point 142. Bracket 106 has slot 108 along which upper pivot point 50 can travel to provide swing arm 42 with additional vertical clearance above the vehicle's roof 28. Lower pivot point 142 allows catch 114 to pivot forward to add further clearance above roof 28 and/or to position a curved sliding surface 144 of less drag against roof 28. A back edge 146 on catch 114 provides catch 114 with a limited range of rotation about pivot point 142.

In some examples, the first and second rear edges 34 (FIG. 1) of the vehicle 14 are vertical. In other examples, the first and second rear edges 34 are not vertical. For example, the first and second rear edges 34 may be titled or slanted relative to vertical. In some examples, the vehicle's upper rear edge 36 extends horizontally. In other examples, the upper rear edge 36 extends at an angle relative to horizontal. For example, the upper rear edge 36 may be inclined or declined. In some examples, header structures 26 and 30 are rotated to a substantially vertical orientation and adapted for use as a side sealing structure (e.g., side sealing structure 32). Front curtain 46 and back membrane 62 can include any suitably flexible material. For instance, in some examples, front curtain 46 includes a 40-ounce vinyl fabric, and back membrane 62 includes a 22-ounce vinyl fabric. In some examples, instead of catch 52 (FIGS. 1-7, 11 and 12) being in a set of two, catch 52 is a single horizontally elongate member that extends over most of the narrowest anticipated vehicle width. In other examples, catch 52 is a set of more than two (e.g., 3, 4, 5, 6, etc.). In some examples, instead of catch 114 (FIGS. 13-20) being in a set of two, catch 114 is a single horizontally elongate member that extends over most of the narrowest anticipated vehicle width. In other examples, catch 114 is a set of more than two (e.g., 3, 4, 5, 6, etc.).

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A weather barrier apparatus for at least one of sealing or sheltering a portion of a vehicle parked at a loading dock of a building that has a doorway in a wall, the weather barrier apparatus comprising:

an upper support member having a distal end and proximal end, the proximal end to be coupled to the wall above the doorway;

a swing arm comprising an upper end and a lower end, the upper end being pivotally coupled to the distal end of the upper support member about an upper pivot point, the lower end of the swing arm being unattached to the wall and suspended from the upper support member to enable the lower end to pivot relative to the upper pivot point, the lower end to pivot about the upper pivot point in a direction toward the doorway of the wall in response to the vehicle engaging the swing arm and moving toward the doorway, the lower end to pivot about the upper pivot point in a direction away from the wall in response to the vehicle moving in a direction away from the doorway; and a seal member coupled to a lower pivot point on the lower end of the swing arm, the seal member being pivotal about the lower pivot point, wherein the lower pivot point is to be closer to the upper pivot point when the weather barrier apparatus is in a relaxed configuration than when the weather barrier apparatus is in an activated configuration.

2. The weather barrier apparatus of claim 1, wherein the seal member is to protrude farther from the swing arm when the weather barrier apparatus is in an activated configuration than when the weather barrier apparatus is in a relaxed configuration.

3. The weather barrier apparatus of claim 1, wherein the swing arm has a first length when the weather barrier apparatus is in an activated configuration and the swing arm has a second length when the weather barrier apparatus is in a relaxed configuration, the first length being greater than the second length.

4. The weather barrier apparatus of claim 1, wherein the seal member is to effectively engage an upper rear edge of the vehicle.

5. The weather barrier apparatus of claim 1, further comprising a brace engaging the swing arm, the brace to urge the swing arm away from the doorway.

6. The weather barrier apparatus of claim 5, wherein the brace has a first length when the weather barrier is in a relaxed configuration and the brace has a second length when the weather barrier is in an activated configuration, the first length being greater than the second length.

7. The weather barrier apparatus of claim 1, wherein the seal member is to effectively engage an upper rear edge of the vehicle when the weather barrier apparatus is in an activated configuration, the seal member coupled to a lower pivot point on the lower end of the swing arm, the seal member being pivotal about the lower pivot point, and the weather barrier apparatus further comprising a brace being coupled to an intermediate point on the swing arm, the brace to urge the swing arm away from the doorway, wherein the intermediate point on the swing arm is between the upper pivot point and the lower pivot point.

8. A weather barrier apparatus for at least one of sealing or sheltering a portion of a vehicle parked at a loading dock of a building that has a doorway in a wall, the weather barrier apparatus comprising:

a support member attachable to the wall;

a telescopic swing arm coupled to the support member and movable between a retracted position and an extended position, the telescopic swing arm having a first end pivotally coupled to the support member and a second end opposite the first end and unattached to the wall to enable the second end of the telescopic swing arm to pivot relative to the first end; and a seal member coupled to the telescopic swing arm, the seal member to effectively engage the vehicle when the weather barrier apparatus is engaged by the vehicle, the weather barrier apparatus being in an activated configuration when the vehicle is in a parked position in front of the doorway and engaging the weather barrier apparatus, the weather barrier apparatus being in a relaxed configuration when the vehicle is in a departed position and separated from the weather barrier apparatus, wherein the seal member is coupled to the telescopic swing arm at an upper point of attachment and at a lower point of attachment, the upper point of attachment to be closer to the lower point of attachment when the weather barrier apparatus is in the activated configuration than when the weather barrier apparatus is in the relaxed configuration.

9. The weather barrier apparatus of claim 8, wherein the seal member is coupled to the telescopic swing arm at an upper point of attachment, and the upper point of attachment is to move along the telescopic swing arm.

10. The weather barrier apparatus of claim 8, wherein the telescopic swing arm is to be substantially linear in the extended position and in the retracted position.

11. The weather barrier apparatus of claim 8, further comprising a flexible elongated member coupled to the telescopic swing arm, the flexible elongated member to urge the swing arm to the retracted position.

12. The weather barrier apparatus of claim 11, further comprising a sheave coupled to the telescopic swing arm and engaging the flexible elongated member.

13. The weather barrier apparatus of claim 8, further comprising a catch coupled to the telescopic swing arm, the catch being suspended from the second end of the telescopic swing arm to engage a rear portion of an upper rear edge of the vehicle when the weather barrier apparatus is in the activated configuration.

14. The weather barrier apparatus of claim 13, wherein the catch is pivotal over a limited range of rotation relative to the telescopic swing arm.

15. The weather barrier apparatus of claim 8, wherein the telescopic swing arm is pivotally coupled to the support member at an upper pivot point, and the upper pivot point is to be substantially vertically moveable relative to the support member.

16. The weather barrier apparatus of claim 8, further comprising a brace engaging the swing arm, the brace to urge the telescopic swing arm away from the doorway.

17. The weather barrier apparatus of claim 16, wherein the brace includes a pneumatic spring.

18. The weather barrier apparatus of claim 8, wherein the seal member is in a less-flattened state when the weather barrier apparatus is in the activated configuration and the seal member is in a more-flattened state when the weather barrier apparatus is in the relaxed configuration.

19. The weather barrier apparatus of claim 11, wherein the seal member is in the more-flattened state when the telescopic swing arm is in the retracted position, and the seal member is in the less-flattened state when the telescopic swing arm is in the extended position.

20. A weather barrier apparatus for at least one of sealing or sheltering a portion of a vehicle parked at a loading dock of a building that has a doorway in a wall, the weather barrier apparatus comprising:

a support member attachable to the wall;

a telescopic swing arm coupled to the support member and movable between a retracted position and an extended position, the telescopic swing arm having a first end pivotally coupled to the support member and a second end opposite the first end and unattached to the wall to enable the second end of the telescopic swing arm to pivot relative to the first end; and a seal member coupled to the telescopic swing arm at an upper point of attachment, the first end of the telescopic swing arm being an upper end of the telescopic swing arm pivotally coupled to the support member via an upper pivot point, the upper pivot point being higher than the upper point of attachment, the seal member to effectively engage the vehicle when the weather barrier apparatus is engaged by the vehicle, the weather barrier apparatus being in an activated configuration when the vehicle is in a parked position in front of the doorway and engaging the weather barrier apparatus, the weather barrier apparatus being in a relaxed configuration when the vehicle is in a departed position and separated from the weather barrier apparatus, the upper point of attachment to be closer to the upper pivot point when the weather barrier apparatus is in the relaxed configuration than when the weather barrier apparatus is in the activated configuration.

21. A weather barrier apparatus for at least one of sealing or sheltering a portion vehicle parked at a loading dock of a building that has a doorway in a wall, the weather barrier apparatus comprising:
  a support attachable to the wall;
  a telescopic swing arm having an upper end and a lower end, the upper end of the swing arm being pivotally coupled to the support about an upper pivot point to enable the lower end of the swing arm to pivot relative to the upper end about the upper pivot point, the lower end of the swing arm being suspended from the support such that the lower end is to pivot freely from the support; and
  a catch coupled to the lower end of the swing arm and suspended in a vehicle travel path leading to the doorway when the weather barrier apparatus is in a relaxed configuration, the weather barrier apparatus being in the relaxed configuration when a vehicle is not in engagement with the weather barrier apparatus, the swing arm is to extend in a direction toward the doorway of the wall when the vehicle is in engagement with the catch and the vehicle moves toward the wall, and the swing arm is to retract in a direction away from the doorway of the wall when the vehicle is in engagement with the catch and the vehicle moves away from the wall.

22. The weather barrier apparatus of claim 21, wherein the upper pivot point is substantially vertically movable relative to the support.

23. The weather barrier apparatus of claim 21, further comprising a foot adjacent the catch, the foot to engage at least one of a roof of the vehicle or a top portion of an upper rear edge of the vehicle when the weather barrier apparatus is in an activated configuration, the weather barrier apparatus being in the activated configuration when a vehicle is in engagement with the weather barrier apparatus.

24. The weather barrier apparatus of claim 23, wherein the foot comprises a sealing element that is to compliantly seal against a top portion of an upper rear edge of the vehicle when the weather barrier apparatus is in an activated configuration.

25. The weather barrier apparatus of claim 23, further comprising a skid member adjacent the swing arm, the skid member extending above the seal and having a vehicle edge guiding surface leading onto the foot of the seal.

26. The weather barrier apparatus of claim 21, wherein a length of the swing arm is variable.

27. The weather barrier apparatus of claim 26, further comprising a spring coupled to the swing arm, the spring to urge the swing arm to a retracted position where a length of the swing arm is less than a length of the swing arm when the swing arm is in an extended position.

28. The weather barrier apparatus of claim 21, further comprising a front curtain suspended from at least one of the support or the swing arm, the front curtain to be suspended in front of the swing arm when the weather barrier apparatus is in an activated configuration, the swing arm to be between the doorway and the front curtain when the weather barrier apparatus is in the activated configuration, and the weather barrier apparatus being in the activated configuration when a vehicle is in engagement with the weather barrier apparatus.

29. The weather barrier apparatus of claim 28, further comprising a back membrane coupled to the seal and the front curtain, the back membrane to be between the swing arm and the front curtain when the weather barrier apparatus is in the activated configuration.

30. The weather barrier apparatus of claim 21, wherein the weather barrier apparatus in an activated configuration is to be selectively in at least one of an arriving activated configuration or a departing activated configuration, the weather barrier apparatus being in the activated configuration when a vehicle is in engagement with the weather barrier apparatus, the weather barrier apparatus further comprising:
  a shiftable connection coupling the seal to the lower end of the swing arm, wherein the shiftable connection is to enable the lower end of the swing arm to be closer to a rear portion of an upper rear edge of the vehicle when the weather barrier apparatus is in the departing activated configuration than when the weather barrier apparatus is in the arriving activated configuration.

31. The weather barrier apparatus of claim 30, wherein the shiftable connection defines a slot, the lower pivot point to move along the slot.

32. The weather barrier apparatus of claim 21, further comprising a brace engaging the swing arm, the brace to urge the swing arm away from the doorway when the weather barrier apparatus is in the relaxed configuration.

33. The weather barrier apparatus of claim 32, wherein the brace engages the swing arm at an intermediate point between the upper pivot point and the lower pivot point.

34. The weather barrier apparatus of claim 32, wherein the brace comprises a pneumatic spring.

35. The weather barrier apparatus of claim 21, further comprising a seal coupled to the swing arm.

36. The weather barrier apparatus of claim 35, wherein the seal is pivotally coupled adjacent the lower end of the swing arm and about a lower pivot point.

37. The weather barrier apparatus of claim 21, wherein the catch is to effectively engage a rear portion of the vehicle and move in a direction toward the doorway of the wall when the vehicle is in engagement with the catch and the vehicle moves toward the wall, and wherein the catch is to move in a direction away from the doorway of the wall when vehicle is moving in a direction away from the wall.

38. A weather barrier apparatus for at least one of sealing or sheltering a portion of a vehicle parked at a loading dock of a building that has a doorway in a wall, the weather barrier apparatus comprising:
  an upper support member having a distal end and proximal end, the proximal end to be coupled to the wall above the doorway;
  a swing arm comprising an upper end and a lower end, the upper end being pivotally coupled to the distal end of the upper support member about an upper pivot point, the lower end of the swing arm being unattached to the wall and suspended from the upper support member to enable the lower end to pivot relative to the upper pivot point, the lower end to pivot about the upper pivot point in a direction toward the doorway of the wall in response to the vehicle engaging the swing arm and moving toward the doorway, the lower end to pivot about the upper pivot point in a direction away from the wall in response to the vehicle moving in a direction away from the doorway; and
  a seal member coupled to the swing arm, wherein the seal member is to be closer to the upper pivot point when the weather barrier apparatus is in a relaxed configuration than when the weather barrier apparatus is in an activated configuration, the weather barrier apparatus being in the activated configuration when the vehicle is in a parked position in front of the doorway and engaging the weather barrier apparatus, the weather barrier apparatus to be in a relaxed configuration when the vehicle is in a departed position when separated from the weather barrier apparatus.

39. The weather barrier apparatus of claim 38, wherein the seal member is to effectively engage the vehicle when the weather barrier apparatus is in an activated configuration.

40. The weather barrier apparatus of claim 38, wherein the seal member includes a surface seal to engage a roof of the vehicle when the weather barrier apparatus is in the activated configuration.

41. A weather barrier apparatus for at least one of sealing or sheltering a portion of a vehicle parked at a loading dock of a building that has a doorway in a wall, the weather barrier apparatus comprising:
   a support member attachable to the wall;
   a telescopic swing arm coupled to the support member and movable between a retracted position and an extended position, the telescopic swing arm having a first end pivotally coupled to the support member and a second end opposite the first end and unattached to the wall to enable the second end of the telescopic swing arm to pivot relative to the first end, wherein the second end of the telescopic swing arm is to extend away from the first end in a direction toward the doorway to the extended position in response to the vehicle engaging the weather barrier apparatus and moving toward the wall, the second end is to retract toward the first end in a direction away from the doorway to the retracted position in response to the vehicle moving away from the wall; and
   a seal member coupled to the telescopic swing arm, the seal member to effectively engage the vehicle when the weather barrier apparatus is engaged by the vehicle, the weather barrier apparatus being in an activated configuration when the vehicle is in a parked position in front of the doorway and engaging the weather barrier apparatus, the weather barrier apparatus being in a relaxed configuration when the vehicle is in a departed position and separated from the weather barrier apparatus.

* * * * *